(12) United States Patent
Liu et al.

(10) Patent No.: US 12,382,447 B2
(45) Date of Patent: Aug. 5, 2025

(54) TECHNIQUES FOR SIDELINK POWER CONTROL AND BETA OFFSET UPDATES OVER SHORTENED PHYSICAL SIDELINK SHARED CHANNEL-BASED MINI-SLOTS

(71) Applicant: QUALCOMM Incorporated, San Diego, CA (US)

(72) Inventors: Chih-Hao Liu, San Diego, CA (US); Xiaoxia Zhang, San Diego, CA (US); Sony Akkarakaran, Poway, CA (US); Yisheng Xue, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/357,222

(22) Filed: Jun. 24, 2021

(65) Prior Publication Data
US 2022/0417947 A1 Dec. 29, 2022

(51) Int. Cl.
*H04W 52/36* (2009.01)
*H04W 52/24* (2009.01)
(Continued)

(52) U.S. Cl.
CPC ......... *H04W 72/121* (2013.01); *H04W 52/24* (2013.01); *H04W 52/242* (2013.01);
(Continued)

(58) Field of Classification Search
CPC .......... H04W 72/121; H04W 72/0446; H04W 72/20; H04W 92/18; H04W 52/242;
(Continued)

(56) References Cited

U.S. PATENT DOCUMENTS

2007/0002859 A1* 1/2007 Corson .................. H04W 4/06
370/432
2016/0353450 A1* 12/2016 Miao ..................... H04W 4/023
(Continued)

FOREIGN PATENT DOCUMENTS

| EP | 4007443 A1 | 6/2022 | |
|---|---|---|---|
| WO | WO-2021014546 A1 * | 1/2021 | |
| WO | WO-2021063493 A1 * | 4/2021 | ............. H04W 4/06 |

OTHER PUBLICATIONS

Partial International Search Report—PCT/US2022/030570—ISA/EPO—Sep. 16, 2022 (2104837WO).
(Continued)

*Primary Examiner* — Thinh D Tran
(74) *Attorney, Agent, or Firm* — Arun Swain

(57) ABSTRACT

This disclosure provides systems, methods and apparatus for partitioning a physical sidelink shared channel (PSSCH) into multiple shortened PSSCHs (sPSSCHs) within a slot and selecting a transmit power for each sPSSCH. In one aspect, a transmitting user equipment (UE) may select the transmit power for each sPSSCH in accordance with an open loop power control operation. In some examples, the transmitting UE may select a common transmit power for each sPSSCH. Alternatively, the transmitting UE may perform independent power control operations for each sPSSCH and may cap variation in transmit power across sPSSCHs as a result of employing lower and upper bound transmit powers. Additionally, or alternatively, the transmitting UE may provide a default beta offset for the set of receiving UEs via sidelink control information (SCI) part one (SCI-1) and may provide beta offset updates via each SCI part two (SCI-2) transmission in the multiple sPSSCHs.

22 Claims, 9 Drawing Sheets

(51) Int. Cl.
*H04W 72/0446* (2023.01)
*H04W 72/121* (2023.01)
*H04W 72/20* (2023.01)
*H04W 92/18* (2009.01)

(52) U.S. Cl.
CPC ......... *H04W 52/36* (2013.01); *H04W 52/367* (2013.01); *H04W 72/0446* (2013.01); *H04W 72/20* (2023.01); *H04W 92/18* (2013.01)

(58) Field of Classification Search
CPC . H04W 52/367; H04W 52/383; H04W 52/24; H04W 52/36; H04L 5/0091
See application file for complete search history.

(56) References Cited

U.S. PATENT DOCUMENTS

| 2020/0205086 A1* | 6/2020 | Wang | H04W 52/243 |
| 2020/0228247 A1* | 7/2020 | Guo | H04L 1/0025 |
| 2021/0037476 A1* | 2/2021 | Ryu | H04W 4/70 |
| 2021/0112544 A1 | 4/2021 | Chen | |
| 2022/0132491 A1* | 4/2022 | Zhang | H04W 28/0226 |
| 2023/0292345 A1* | 9/2023 | Lei | H04W 72/25 |

OTHER PUBLICATIONS

International Search Report and Written Opinion—PCT/US2022/030570—ISA/EPO—Nov. 8, 2022 (2104837WO).

* cited by examiner

1 Slot

TECHNIQUES FOR SIDELINK POWER CONTROL AND BETA OFFSET UPDATES OVER SHORTENED PHYSICAL SIDELINK SHARED CHANNEL-BASED MINI-SLOTS

TECHNICAL FIELD

This disclosure relates to wireless communications, including techniques for sidelink power control and beta offset updates over shortened physical sidelink shared channel (sPSSCH)-based mini-slots.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UEs).

In some systems, a first UE may communicate with a second UE via a sidelink communication channel.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include transmitting, to a set of receiving UEs over a sidelink control channel, an indication of a sidelink shared channel within a slot, where the slot is partitioned into a set of multiple portions, selecting, for each portion of the sidelink shared channel, a transmit power using one or more communication parameters that are associated with the sidelink shared channel and that are common to the set of receiving UEs, and transmitting, to each UE of the set of receiving UEs over the sidelink shared channel, in accordance with the transmit power selected for each portion of the sidelink shared channel.

Another innovative aspect of the subject matter described in this disclosure can be implemented in an apparatus for wireless communications at a UE. The apparatus may include a first interface, a second interface, and a processing system. The first interface may be configured to output, to a set of receiving UEs over a sidelink control channel, an indication of a sidelink shared channel within a slot, where the slot is partitioned into a set of multiple portions. The processing system may be configured to select, for each portion of the sidelink shared channel, a transmit power using one or more communication parameters that are associated with the sidelink shared channel and that are common to the set of receiving UEs. The first interface may be further configured to output, to each UE of the set of receiving UEs over the sidelink shared channel, in accordance with the transmit power selected for each portion of the sidelink shared channel Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to transmit, to a set of receiving UEs over a sidelink control channel, an indication of a sidelink shared channel within a slot, where the slot is partitioned into a set of multiple portions, select, for each portion of the sidelink shared channel, a transmit power using one or more communication parameters that are associated with the sidelink shared channel and that are common to the set of receiving UEs, and transmit, to each UE of the set of receiving UEs over the sidelink shared channel, in accordance with the transmit power selected for each portion of the sidelink shared channel.

Another innovative aspect of the subject matter described in this disclosure can be implemented in another apparatus for wireless communications at a UE. The apparatus may include means for transmitting, to a set of receiving UEs over a sidelink control channel, an indication of a sidelink shared channel within a slot, where the slot is partitioned into a set of multiple portions, means for selecting, for each portion of the sidelink shared channel, a transmit power using one or more communication parameters that are associated with the sidelink shared channel and that are common to the set of receiving UEs, and means for transmitting, to each UE of the set of receiving UEs over the sidelink shared channel, in accordance with the transmit power selected for each portion of the sidelink shared channel.

Another innovative aspect of the subject matter described in this disclosure can be implemented in a non-transitory computer-readable medium storing code for wireless communications at a UE. The code may include instructions executable by a processor to transmit, to a set of receiving UEs over a sidelink control channel, an indication of a sidelink shared channel within a slot, where the slot is partitioned into a set of multiple portions, select, for each portion of the sidelink shared channel, a transmit power using one or more communication parameters that are associated with the sidelink shared channel and that are common to the set of receiving UEs, and transmit, to each UE of the set of receiving UEs over the sidelink shared channel, in accordance with the transmit power selected for each portion of the sidelink shared channel.

Another innovative aspect of the subject matter described in this disclosure can be implemented in a method for wireless communications at a UE. The method may include receiving, via a sidelink control information (SCI) part one (SCI-1) transmission, an indication of a sidelink shared channel within a slot and an indication of a default resource element offset associated with multiple SCI part two (SCI-2) transmissions, where the slot is partitioned into a set of multiple portions, receiving a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel, and receiving the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

Another innovative aspect of the subject matter described in this disclosure can be implemented in an apparatus for wireless communications at a UE. The apparatus may include a first interface, a second interface, and a processing system. The first interface may be configured to obtain, via an SCI-1 transmission, an indication of a sidelink shared channel within a slot and an indication of a default resource element offset associated with multiple SCI-2 transmissions, where the slot is partitioned into a set of multiple portions. The first interface may be further configured to obtain a first SCI-2 transmission over a first portion of the sidelink shared channel in accordance with the default resource element offset indicated in the SCI-1, the first SCI-2 transmission indicating a first resource element offset associated with a second SCI-2 transmission to be obtained over a second portion of the sidelink shared channel. The first interface may be further configured to obtain the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be obtained over a third portion of the sidelink shared channel.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive, via an SCI-1 transmission, an indication of a sidelink shared channel within a slot and an indication of a default resource element offset associated with multiple SCI-2 transmissions, where the slot is partitioned into a set of multiple portions, receive a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel, and receive the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

Another innovative aspect of the subject matter described in this disclosure can be implemented in another apparatus for wireless communications at a UE. The apparatus may include means for receiving, via an SCI-1 transmission, an indication of a sidelink shared channel within a slot and an indication of a default resource element offset associated with multiple SCI-2 transmissions, where the slot is partitioned into a set of multiple portions, means for receiving a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel, and means for receiving the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

Another innovative aspect of the subject matter described in this disclosure can be implemented in a non-transitory computer-readable medium storing code for wireless communications at a UE. The code may include instructions executable by a processor to receive, via a SCI-1 transmission, an indication of a sidelink shared channel within a slot and an indication of a default resource element offset associated with multiple SCI-2 transmissions, where the slot is partitioned into a set of multiple portions, receive a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel, and receive the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
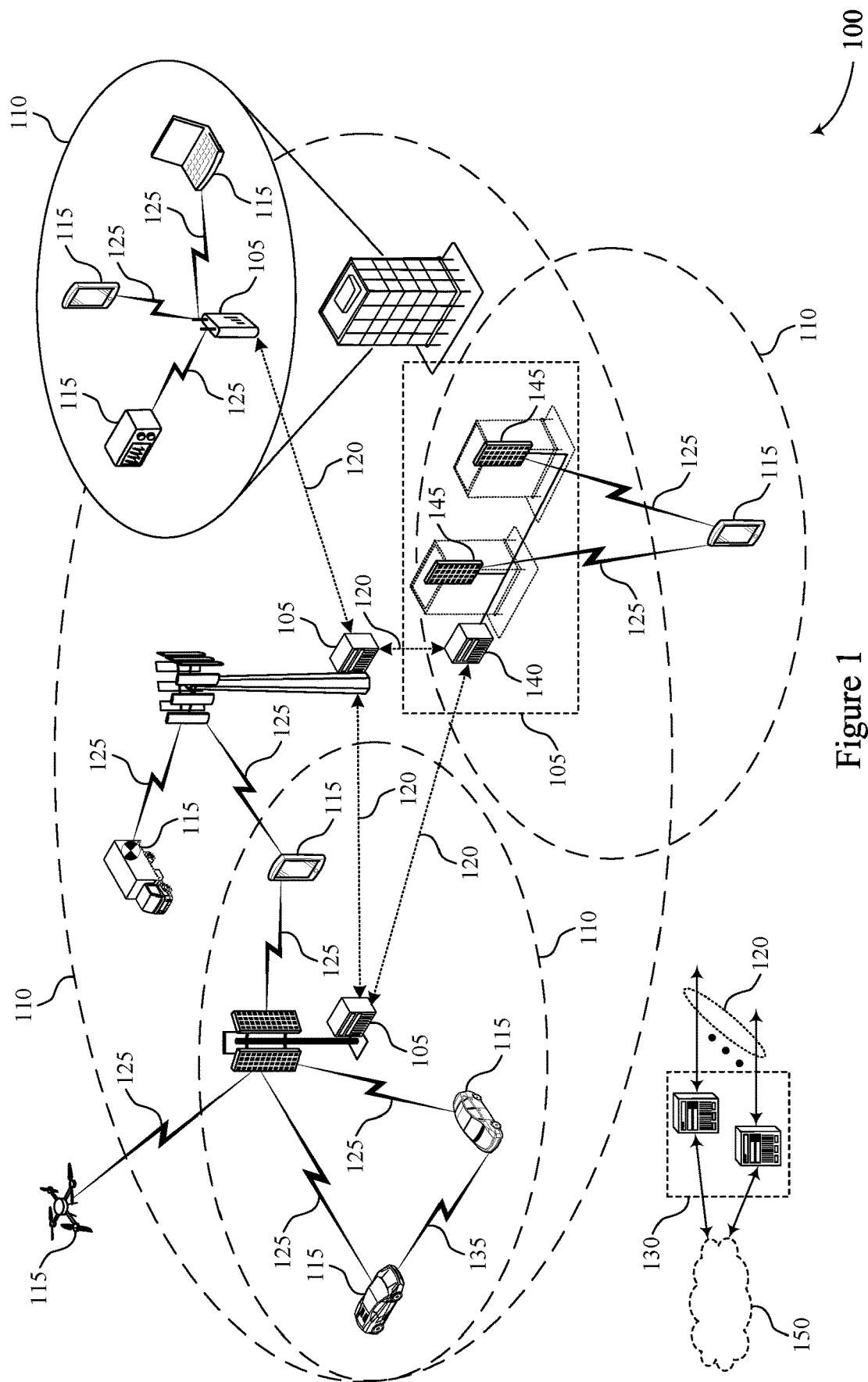
FIG. 1 illustrates an example wireless communications system that supports techniques for sidelink power control and beta offset updates over shortened physical sidelink shared channel (sPSSCH)-based mini-slots.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, a first user equipment (UE) may communicate with multiple other UEs over a physical sidelink shared channel (PSSCH) that is divided into multiple portions. In some examples, each portion of the PSSCH may be an example of a shortened PSSCH (sPSSCH). The first UE may transmit sidelink data over each sPSSCH and, in some implementations, may transmit to different UEs over different sPSSCHs. In such examples, the first UE may transmit sidelink control information (SCI) to the multiple receiving UEs. The first UE may transmit a first portion of SCI (SCI-1 or SCI part one) over a physical sidelink control channel (PSCCH) that is common for the multiple receiving UEs, and may transmit a different second portion of SCI (SCI-2 or SCI part two) within each sPSSCH.

In some examples, the first UE may provide a default beta offset for the multiple receiving UEs via the common SCI-1 and the multiple receiving UEs may use the default beta offset to reserve a set of resources over which to search for SCI-2 transmissions over the various sPSSCHs. Such a default beta offset may refer to any beta offset provided via SCI-1 or a beta offset that is commonly used by each of the multiple receiving UEs and may indicate a common or baseline SCI-2 resource reservation for the multiple receiving UEs. If different UEs of the multiple receiving UEs are located at varying distances from the first UE or otherwise have different coverage levels or constraints, however, the first UE may set the default beta offset conservatively, which may result in an over-reservation of resources at some UEs (such as UEs that are relatively near the first UE). Further, communication with different UEs over multiple sPSSCHs within a slot may result in ambiguity for transmit power control operations.

In some implementations of the present disclosure, the first UE may employ an sPSSCH-based power control operation according to which the first UE selects, calculates, or otherwise determines a transmit power for each sPSSCH within the slot. In some examples, the first UE may employ a common power control operation for the sPSSCHs within the slot (such as for all the sPSSCHs within the slot). In such examples, the first UE may receive an indication of a common nominal sidelink power parameter, a common resource block allocation parameter, and a common (and conservative) pathloss parameter for each of the sPSSCHs within the slot and may select, calculate, or otherwise determine a transmit power for each sPSSCH using such common communication parameters. In some other examples, the first UE may employ independent power control operations for each of the sPSSCHs within the slot with limited or capped variation between sPSSCHs. In such examples, the first UE may select, calculate, or otherwise determine a lower bound transmit power and an upper bound transmit, compare a transmit power calculated for each sPSSCH to the lower bound transmit power and the upper bound transmit power, and select, for each sPSSCH, the lower bound transmit power, the transmit power calculated for that sPSSCH, or the upper bound transmit power in accordance with the comparison.

Additionally, or alternatively, the first UE may provide a beta offset in each SCI-2 transmission to progressively update an SCI-2 resource reservation for UEs receiving subsequent SCI-2 transmissions within the slot. Such a beta offset that is provided via SCI-2 may supplement the default beta offset that is provided via SCI-1. As such, beta offsets provided via SCI-2 may effectively adjust or modify the common or baseline SCI-2 resource reservation indicated by the default beta offset in a cumulative manner. For example, the first UE may transmit the default beta offset to the multiple receiving UEs (such as to all of the multiple receiving UEs) via the common SCI-1, the multiple receiving UEs may use the default beta offset to reserve resources over which to decode for a first SCI-2 in a first sPSSCH, and, in some implementations, the first UE may transmit another beta offset (a first beta offset) via the first SCI-2 in the first sPSSCH. As such, the receiving UEs may use the first beta offset provided via the first SCI-2 in the first sPSSCH (and the default beta offset provided by the common SCI-1) to reserve resources over which to decode for a second SCI-2 in a second sPSSCH. In such implementations, each of the receiving UEs may be able to decode SCI-2 in each sPSSCH and, in some examples, the beta offsets provided via SCI-2 transmissions over the various sPSSCHs may include a delta decrement relative to a previous resource reservation, an indication to maintain the previous resource reservation, or an indication to reset to the default beta offset indicated in the SCI-1.

Particular implementations of the subject matter described in this disclosure can be implemented to realize one or more of the following potential advantages. For example, the described techniques may be implemented to define power control operations of sPSSCH-based communication. As such, the first UE may consistently provide data transmissions over sPSSCHs to various, potentially diversely located receiving UEs with a sufficient transmit power while still keeping the transmit powers within a threshold range. Accordingly, the receiving UEs may each train a receive path (for example, set a receive gain) using a first symbol of the slot and receive respective sPSSCHs with a similar receive power as that to which the receiving UEs trained their receive paths, which may increase the likelihood of successful reception of transmissions over the sPSSCHs. Additionally, the described power control techniques may be implemented to save transmit power for some receiving UEs as a result of performing independent power control operations for each sPSSCH as well as to control interference to other, non-target receiving UEs with finer granularity (such as on a per-sPSSCH basis).

Further, the described techniques may be implemented to increase a spectral efficiency of sPSSCH-based communication as a result of providing beta offsets in each SCI-2 transmission over the multiple sPSSCHs. For example, with successive beta offset updates, SCI-2 resource allocations may be adjusted to include an amount of resources that maximizes spectral efficiency (for example, may be adjusted to include just enough resources) while still facilitating a high likelihood for successful SCI-2 decoding. As such, the first UE may control and configure unique resource reservations for SCI-2 transmissions for each receiving UE of the set of receiving UEs in accordance with a coverage level of that receiving UE. Additionally, and as a result of such a greater likelihood for successful communication and greater spectral efficiency, the UEs within the system may experience higher data rates, greater system throughput, and higher reliability.

FIG. 1 illustrates an example of a wireless communications system 100 that supports techniques for sidelink power control and beta offset updates over sPSSCH-based mini-slots. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture.

The wireless communications system 100 may operate using one or more frequency bands, sometimes in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as one or more components of a BS 105, or by a receiving device, such as a UE 115) a beam direction for later transmission or reception by the BS 105.

Some signals, such as data signals associated with a particular receiving device, may be transmitted by one or more components of a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by one or more components of a BS 105 or a UE 115) may be performed using multiple beam directions, and the device may use a combination of digital precoding or radio frequency beamforming to generate a combined beam for transmission (for example, from one or more components of a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by one or more components of a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some examples, multiple UEs 115 may communicate with each other via sidelink communication channels, including via a PSCCH and via a PSSCH. To achieve dynamic and flexible communication to multiple UEs 115 in a low-latency environment, a first UE 115 may, in some implementations, employ an sPSSCH mini-slot pattern in which a PSSCH portion of a slot is partitioned or divided into multiple portions. For example, the PSSCH portion of a slot may be partitioned or divided into multiple time domain portions, each time domain portion (each mini-slot) corresponding to a different sPSSCH. In some implementations, the first UE 115 may dynamically control the sPSSCH mini-slot pattern and may transmit an indication of the pattern to a set of receiving UEs 115 (such as UEs 115 to which the first UE 115 delivers data over at least one sPSSCH of the multiple sPSSCHs within the slot).

The first UE 115 may select a transmit power for each sPSSCH and may transmit to each of the set of receiving UEs 115 over at least one sPSSCH of the multiple sPSSCHs. For example, the first UE 115 may deliver different sPSSCHs to different receivers and, accordingly, the transmit power that the first UE 115 selects for each sPSSCH may potentially vary (as different receivers may be associated with different pathloss parameters or coverage levels). In some implementations, the first UE 115 may select the transmit power for each sPSSCH using either a common transmit power control operation for the multiple sPSSCHs within the slot or using independent transmit power control operations for each sPSSCH within the slot (with limited or capped variation between sPSSCHs).

In either of such implementations, the first UE 115 may select the transmit power for each sPSSCH in accordance with one or more communication parameters that are common to the set of receiving UEs. For instance, in examples in which the first UE 115 selects a common transmit power for the multiple sPSSCHs, the first UE 115 may select the common transmit power using the one or more communication parameters that are common to the set of receiving UEs. Alternatively, in examples in which the first UE 115 selects a transmit power for each sPSSCH independently, the first UE 115 may cap or limit the transmit power variation between sPSSCHs by selecting a lower bound transmit power and an upper bound transit power using the one or more communication parameters that are common to the set of receiving UEs.

Accordingly, the first UE 115 may transmit over each sPSSCH in accordance with the selected transmit power(s) and, in some implementations, may include a beta offset update in an SCI-2 transmission within each sPSSCH. As such, the first UE 115 may have control over resource reservations made by the set of receiving UEs for decoding SCI-2 on a per-sPSSCH basis. For example, the first UE 115 may adjust or update a resource reservation for SCI-2 in a subsequent sPSSCH via a beta offset update in a previous sPSSCH SCI-2 transmission and may make such adjustments or updates in accordance with a coverage level associated with one or more UEs 115 receiving the subsequent sPSSCH (or receiving at least the SCI-2 sent over the subsequent sPSSCH).

Figure 2:
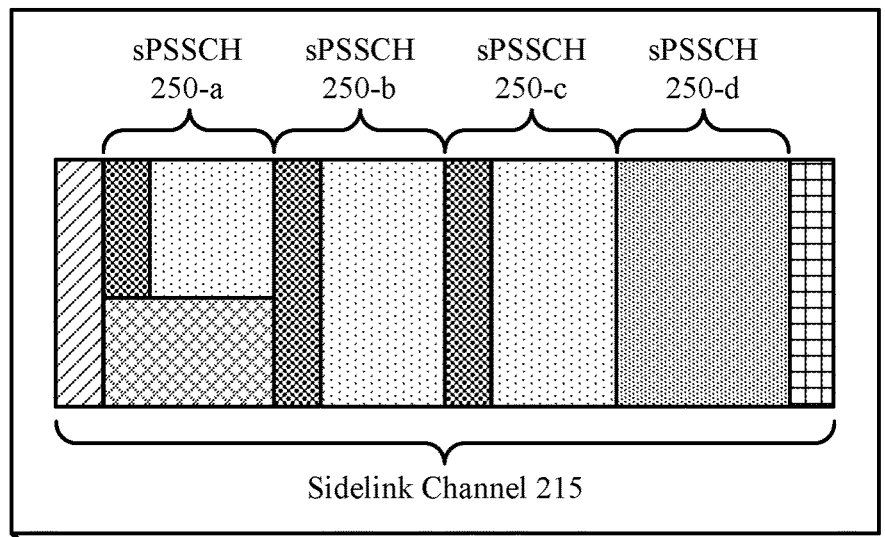
FIG. 2 illustrates an example signaling diagram that supports techniques for sidelink power control and beta offset updates over sPSSCH-based mini-slots.
Figure 2:
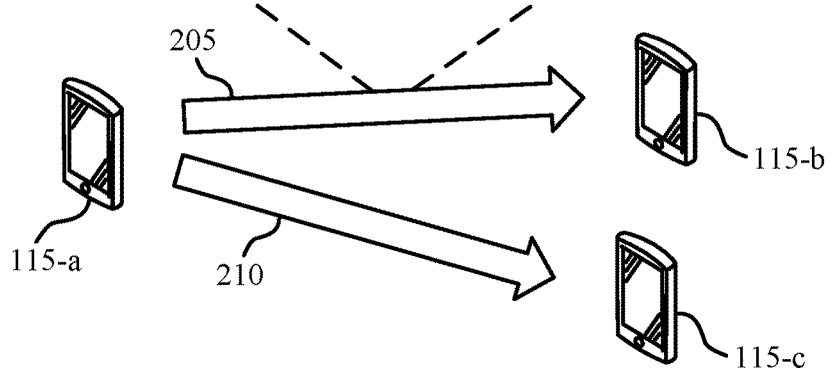
Figure 2:
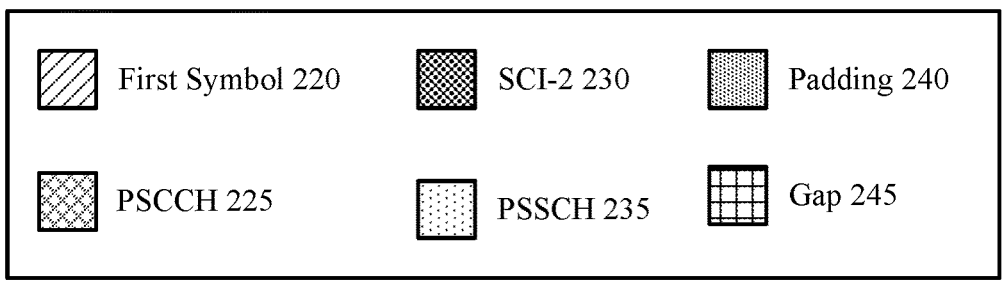

FIG. 2 illustrates an example signaling diagram 200 that supports techniques for sidelink power control and beta offset updates over sPSSCH-based mini-slots. The signaling diagram may implement or be implemented to realize aspects of the wireless communications system 100. For example, the signaling diagram 200 illustrates communication between a UE 115-a, a UE 115-b, and a UE 115-c, which may be examples of corresponding devices described herein, including with reference to FIG. 1. In some examples, the UE 115-a may transmit to a set of receiving UEs 115, including the UE 115-b and the UE 115-c, over a sidelink channel 215 featuring a PSSCH 235 that is partitioned into multiple sPSSCHs 250 and may employ a transmit power control operation to select a transmit power for each sPSSCH 250.

For example, the UE 115-a may communicate with the UE 115-b via a communication link 205 and may communicate with the UE 115-c via a communication link 210 and, in some examples, the communication link 205 and the communication link 210 may be referred to or otherwise understood as sidelinks. As described herein, the UE 115-a, the UE 115-b, and the UE 115-c may be examples of or representative of any sidelink devices, including any device that is capable of communicating with one or more other peer devices. As such, other nodes, any other sidelink communication devices (such as wearable devices), or small cells also may be representative sidelink devices and the UE 115-a, the UE 115-b, and the UE 115-c may likewise be examples of or understood as any of such devices without exceeding the scope of the present disclosure.

In some examples, the UE 115-a, the UE 115-b, and the UE 115-c may support an sPSSCH-based slot design according to which the sidelink channel 215 (which may span one slot) is divided into multiple mini-slots. Such mini-slots may divide the PSSCH 235 of the sidelink channel 215 into multiple sPSSCHs 250 and the UE 115-a may use such sPSSCH-based mini-slots for dynamic scheduling. An sPSSCH 250 may start at any location within a slot (or within the sidelink channel 215) and, in some examples, may start in the middle of the slot (such as after a first symbol 220). A location and quantity of sPSSCHs 250 within a slot may vary between different sPSSCH mini-slot patterns (for example, the UE 115-a, the UE 115-b, and the UE 115-c may support multiple different sPSSCH mini-slot patterns, each pattern associated with a unique combination of location and quantity of sPSSCHs 250). As shown in FIG. 2, the UE 115-a, the UE 115-b, and the UE 115-c may support an sPSSCH mini-slot pattern according to which the PSSCH 235 is divided into four sPSSCHs 250, including an sPSSCH 250-a, an sPSSCH 250-b, an sPSSCH 250-c, and an sPSSCH 250-d. Further, the sidelink channel 215 may include the first symbol 220, a PSCCH 225, padding 240, and a gap 245.

The UE 115-a (a transmitting device) may control (such as dynamically control) the sPSSCH mini-slot pattern. In some implementations, for example, the UE 115-a may transmit an indication of the sPSSCH mini-slot pattern to the UE 115-b and the UE 115-c (receiving devices) via the PSCCH 225. For example, the UE 115-a may transmit an indication of the sPSSCH mini-slot pattern via SCI-1 that is sent over the PSCCH 225. Such an indication of the sPSSCH mini-slot pattern may indicate the pattern (explicitly or from a set of available or pre-configured patterns) or may enable or disable the sPSSCH mini-slot pattern, or both. In some examples, and as a result of dynamically indicating the sPSSCH mini-slot pattern, the UE 115-b and the UE 115-c (the receiving devices) may experience greater power savings.

Further, the UE 115-a may use the sPSSCH mini-slot pattern to provide dynamic grants for the UE 115-b and the UE 115-c. For example, the UE 115-a may embed or otherwise transmit SCI-2 230 over each sPSSCH 250 for sPSSCH scheduling. In some examples, each SCI-2 230 may include a K1 value indicating a physical sidelink feedback channel (PSFCH) resource over which a receiving UE 115 of that sPSSCH 250 is to transmit feedback responsive to that sPSSCH 250. As illustrated by and described in more detail with reference to FIG. 5, a K1 indication value carried in SCI-2 230 over an sPSSCH 250 may indicate an enhanced PSFCH (ePSFCH) resource. As described herein, any one or more of a set of receiving UEs 115 may receive and decode an sPSSCH 250 in accordance with which one or more UEs 115 that sPSSCH 250 addresses (via one or more destination IDs in an SCI-2 230 sent over that sPSSCH 250).

One or more receiving UEs 115 (such as one or both of the UE 115-b or the UE 115-c) may attempt to decode an SCI-2 230 in each sPSSCH 250 over a set (such as a quantity) of resources. In some examples, the set or quantity of resources over which the UE 115-a transmits an SCI-2 230 may be rate-matched around a data transmission sent over the PSSCH 235 (or an sPSSCH 250). In such examples, a number of rate-matched symbols $Q'_{SCI2}$ of the set of resources may be given by Equation 1, shown below.

$$Q'_{SCI2} = \min\left\{\left\lceil\frac{(O_{SCI2} + L_{SCI2}) \cdot \beta_{offset}^{SCI2}}{Q_m^{SCI2} \cdot R}\right\rceil, \left\lceil\alpha \sum_{l=0}^{N_{symbol}^{PSSCH}-1} M_{sc}^{SCI2}(l)\right\rceil\right\} + \gamma \quad (1)$$

In some examples, the UE 115-a may transmit modulation and coding scheme (MCS) information and a conservative beta offset $\beta_{offset}^{SCI2}$ via the SCI-1 that is sent over the PSCCH 225, the MCS information and the conservative beta offset being common for the multiple sPSSCHs 250 (such as for all sPSSCHs 250) associated with the SCI-1. For example, if the UE 115-a transmits to multiple receiving UEs 115 (such as the UE 115-b and the UE 115-c) within a slot, the UE 115-a may set or define the beta offset provided via the SCI-1 according to a greatest coverage level constraint or greatest pathloss of the multiple receiving UEs 115 within the slot. In other words, if the UE 115-b is associated with a first coverage level constraint or first pathloss that is greater than a second coverage level constraint or second pathloss associated with the UE 115-c (for example, if the UE 115-b is relatively farther away from the UE 115-a than the UE 115-c is), the UE 115-a may set or define the beta offset provided via the SCI-1 in accordance with or using the first coverage level constraint or first pathloss associated with the UE 115-b. As such, the UE 115-a may select or otherwise determine the conservative beta offset in accordance with a receiver with a "worst" coverage level constraint or pathloss. As a result of employing such a conservative beta offset, each (all) of the multiple receiving UEs 115 may monitor for SCI-2 230 over a sufficient amount or quantity of resources regardless of their specific or unique coverage level constraint or pathloss.

In some examples, the UE 115-a (or one or more components of a BS 105 scheduling communication from the UE 115-a) may employ receiver grouping to group receiving UEs 115 with similar coverage level constraints or pathlosses together. Such a group of UEs 115 featuring similar coverage level constraints or pathlosses may be referred to herein as a beta offset group. As such, the receiving UEs 115 to which the UE 115-a transmits over the sPSSCHs 250 associated with (scheduled by) a given SCI-1 may use relatively similar beta offsets (such as relatively similar minimum beta offsets) to successfully receive SCI-2 230 over the sPSSCHs 250. In other words, for example, the one or more components of the BS 105 or a scheduler of the UE 115-a (a transmitter) may schedule sPSSCHs 250 in a slot to receiving UEs 115 within a same beta offset group.

Such receiver grouping on the basis of coverage level constraint or pathloss (or on the basis of minimum beta offset) and the transmission to each of the receivers within the group over various sPSSCHs 250 within a slot may result in more dynamic scheduling and lower latency, but also may result in ambiguity in terms of transmit power control as well as complexities associated with maintaining up-to-date receiver grouping. For example, the UE 115-a may lack a configuration for open loop power control for sPSSCHs 250 and, as a result of UE mobility, receiver grouping may not be trivial. Further, if there is a relatively small number of receivers in some applications or deployment scenarios, the one or more components of the BS 105 or the scheduler of the UE 115-a may group receivers together with different coverage level constraints or different pathlosses (such that coverage level constraints or pathlosses within a group vary more than a threshold amount) to save on resources. In such examples, the UE 115-a may select, choose, or otherwise determine a conservative beta offset for both a close by receiver and an edge receiver if both receivers are addressed in the same slot. As such, the SCI-1 indicated beta offset may reserve too many resources for the close by receiver as the close by receiver may not be constrained to the same coverage level as the edge receiver. Such an over-reservation of SCI-2 resources for an sPSSCH 250 associated with the close by receiver may result in resource overhead and reduce an amount of resources (such as an amount of resource elements) within the sPSSCH 250 that are available for data.

In terms of transmit power control, the UE 115-a may sometimes rely on open loop power control for transmissions over a PSSCH 235. For unicast, for example, the UE 115-a may select a transmit power $P_{PSSCH,SL}(i)$ in accordance with Equation 2, shown below.

$$P_{PSSCH,SL}(i) = P_{O,SL} + 10\ \log_{10}(2^{\mu} \cdot M_{RB}^{PSSCH}(i)) + \alpha_{SL} \cdot PL_{SL} \qquad (2)$$

In examples in which the UE 115-a transmits to different receiving UEs 115 over different sPSSCHs 250 (or otherwise delivers or addresses different sPSSCHs 250 to different receivers), however, the UE 115-a may lack a rule or configuration for selecting a transmit power for different sPSSCHs 250. Further, for sPSSCHs 250 within a given slot, a number of allocated resource blocks are the same and power variation across different sPSSCHs 250 may be undesirable (for example, may cause errors) for another receiver that decodes a PSSCH 235 that does not feature sPSSCHs 250 (such as a legacy PSSCH). For example, the other receiver decoding the PSSCH 235 that is absent of sPSSCHs 250 may tolerate up to x % of power variation within PSSCH symbols (such that exceeding x % may result in an error rate exceeding a threshold). In some examples, for instance, some receiving UEs 115 may train an automatic gain control (AGC) of a receive path or set a gain for the AGC of the receive path using the first symbol 220 and errors may arise if symbols within the slot occupied by the sidelink channel 215 are transmitted using a transmit power that deviates greater than a threshold amount relative to the first symbol 220.

In some implementations, the UE 115-a may employ common power control for (all of) the sPSSCHs 250 within a slot. In such implementations, for example, the UE 115-a may select (or receive from one or more components of a BS 105) a common nominal sidelink power parameter $P_{O,SL}$ and a common resource block allocation parameter (which may be equivalently referred to as a resource block parameter) $M_{RB}^{sPSSCH}$ and the UE 115-a may use the nominal sidelink power parameter $P_{O,SL}$ and the resource block allocation parameter $M_{RB}^{sPSSCH}$ to select a common transmit power for each sPSSCH 250 within the slot. Additionally, or alternatively, and even though a pathloss parameter $PL_{SL,Rxer\_k}$ could be different for different receivers k, the UE 115-a may select (or receive from one or more components of a BS 105) a common and conservative pathloss parameter for (all of) the sPSSCHs 250 within the slot. In such examples, the UE 115-a may use the nominal sidelink power parameter $P_{O,SL}$, the resource block allocation parameter $M_{RB}^{sPSSCH}$ and the common pathloss parameter to select a common transmit power for each sPSSCH 250 within the slot. Further, although the UE 115-a may sometimes select a common pathloss parameter and use such common communication parameters (the nominal sidelink power parameter $P_{O,SL}$, the resource block allocation parameter $M_{RB}^{sPSSCH}$, and the common pathloss parameter) to select a transmit power for each sPSSCH 250, the UE 115-a may, as an alternative, independently or separately select a pathloss parameter for each sPSSCH 250 and select a transmit power for that sPSSCH 250 using the nominal sidelink power parameter $P_{O,SL}$, the resource block allocation parameter $M_{RB}^{sPSSCH}$, and the pathloss parameter independently or separately selected for that sPSSCH 250.

Additionally, or alternatively, the UE 115-a may select a transmit power for each sPSSCH 250 independently (such that the UE 115-a may potentially use a different transmit power over each sPSSCH 250) but with limited variation. For example, the UE 115-a may employ an open loop power control procedure for sPSSCHs 250 with limited variation as a result of selecting, calculating, or otherwise determining a transmit power for each sPSSCH 250 independently and comparing the transmit power for that sPSSCH 250 with an upper and lower bound. In such examples, the UE 115-a may select or calculate a nominal transmit power $P_{sPSSCH,O}$ for an sPSSCH-based slot using the common nominal sidelink power parameter $P_{O,SL}$, the common resource block allocation parameter $M_{RB}^{sPSSCH}$, and a nominal pathloss parameter $PL_{SL,O}$ that the UE 115-a may set (in accordance with an implementation decision, a pre-configuration, or a specification) and may select an upper bound transmit power and a lower bound transmit power relative to the nominal transmit power $P_{sPSSCH,O}$. The UE 115-a may select or calculate the nominal transmit power $P_{sPSSCH,O}$ in accordance with Equation 3, shown below.

$$P_{sPSSCH,O} = P_{O,SL} + 10\ \log(2^{\mu} \cdot M_{RB}^{sPSSCH}) + \alpha \cdot PL_{SL,O} \qquad (3)$$

In some examples, the UE 115-a may apply an actual pathloss to compute a transmit power (a second transmit power) for each sPSSCH 250 within the slot. In such examples, the UE 115-a may select or receive an indication of the actual pathloss parameter for each sPSSCH 250 in accordance with a coverage level constraint or a pathloss associated with one or more UEs 115 to which that sPSSCH 250 is addressed. For example, the UE 115-*a* may select or calculate a transmit power for the $k^{th}$ sPSSCH 250 within the slot using a pathloss parameter $P_{SL,k}$ in accordance with Equation 4, shown below.

$$P_{sPSSCH,k} = P_{O,SL} + 10 \log(2^u \cdot M_{RB}^{sPSSCH}) + \alpha \cdot PL_{SL,k} \quad (4)$$

In some implementations, the UE 115-*a* may select, calculate, or otherwise determine the upper bound transmit power and the lower bound transmit power such that an actual transmit power does not have a variation greater than y % with respect to the nominal transmit power $P_{sPSSCH,O}$. In such implementations, the UE 115-*a* may select, calculate, or otherwise determine the upper bound transmit power as $$\left(1 + \frac{y}{100}\right).$$

$P_{sPSSCH,O}$ and may select, calculate, or otherwise determine the lower bound transmit power as $$\left(1 - \frac{y}{100}\right).$$

$P_{sPSSCH,O}$. The y % variation threshold may limit the received power variation for the receiving UEs 115. In some examples, y may be a pre-configured value. In some other examples, the UE 115-*a* may select y (in accordance with a UE decision, a deployment scenario, or how a set of receiving UEs 115 vary in terms of coverage level constraint or pathloss). In such examples, the UE 115-*a* may select y from a set of available values or may calculate y using a function. In some implementations, y may depend on an upper limit or maximum ratio of a number of subchannels that may use an sPSSCH-based pattern to a number of subchannels in a PSSCH pool (within a slot).

As a result of selecting or calculating the upper bound transmit power and the lower bound transmit power, the UE 115-*a* may compare the selected or calculated $P_{sPSSCH,k}$ with both the upper bound transmit power and the lower bound transmit power and may select one of the lower bound transmit power, the selected or calculated $P_{sPSSCH,k}$, or the upper bound transmit power as an actual transmit power $P_{sPSSCH,k}$, actual for the $k^{th}$ sPSSCH 250 in accordance with the comparison. For example, the UE 115-*a* may select the lower bound transmit power as the actual transmit power if the selected or calculated $P_{sPSSCH,k}$ is less than the lower bound transmit power, may select the selected or calculated $P_{sPSSCH,k}$ if the selected or calculated $P_{sPSSCH,k}$ is greater than or equal to the lower bound transmit power and less than or equal to the upper bound transmit power, or may select the upper bound transmit power if the selected or calculated $P_{sPSSCH,k}$ is greater than the upper bound transmit power. Such selection of the actual transmit power for the $k^{th}$ sPSSCH 250 is also described by Equation 5, shown below.

$$P_{sPSSCH,k,actual} = \begin{cases} \left(1 - \frac{y}{100}\right) \cdot P_{sPSSCH,O}, & \text{if } \left(1 - \frac{y}{100}\right) \cdot P_{sPSSCH,O} > P_{sPSSCH,k} \\ P_{sPSSCH,k}, & \text{if } \left(1 - \frac{y}{100}\right) \cdot P_{sPSSCH,O} \leq P_{sPSSCH,k} \leq \left(1 + \frac{y}{100}\right) \cdot P_{sPSSCH} \\ \left(1 + \frac{y}{100}\right) \cdot P_{sPSSCH,O}, & \text{if } \left(1 + \frac{y}{100}\right) \cdot P_{sPSSCH,O} < P_{sPSSCH,k} \end{cases} \quad (5)$$

In some implementations, one or more components of a BS 105 or the scheduler of the UE 115-*a* may perform receiver grouping in accordance with a pathloss of the receivers such that receivers with similar pathlosses are grouped together. In such implementations, the one or more components of the BS 105 or the scheduler of the UE 115-*a* may select to transmit to receivers within a same group over a same slot and subchannel and may select to transmit to a different receiver group over a different slot or a different subchannel. Such receiver grouping is illustrated by and described in more detail with reference to FIG. 3.

In some implementations, the UE 115-*a* may, in addition, or as an alternative, to selecting a transmit power for each sPSSCH 250 within the slot, provide a beta offset update via each SCI-2 230 that the UE 115-*a* transmits over each sPSSCH 250. For example, and as described herein, the beta offset that the UE 115-*a* signals via the SCI-1 sent over the PSCCH 225 is likely to be the most conservative (such as the largest) beta offset that ensures that each receiver of the set of receivers is able to decode the SCI-2 230 in an sPSSCH 250 associated with (addressed to) that receiver and, in implementations in which the UE 115-*a* provides a beta offset update via SCI-2 230, the UE 115-*a* may adjust (such as reduce) the amount of resources that are reserved for SCI-2 230 in any later sPSSCHs 250 if the UE 115-*a* has knowledge that the later sPSSCHs 250 have smaller or less strict coverage level constraints.

For example, the UE 115-*a* may transmit a default beta offset via the SCI-1 that is sent over the PSCCH 225 and the UE 115-*b* and the UE 115-*c* may select a set of resources (such as a set of resource elements) over which the UE 115-*b* and the UE 115-*c* may commonly search for SCI-2 in each respective sPSSCH 250 in accordance with the default beta offset. As such, the UE 115-*b* and the UE 115-*c* may monitor and decode over the set of resources to obtain the SCI-2 230 that the UE 115-*a* sends over the sPSSCH 250-*a*. In some examples, if the sPSSCH 250-*a* is addressed to the UE 115-*b* and later sPSSCHs 250 are addressed to other UEs 115 (such as the UE 115-*c*) and if the UE 115-*b* is associated with a relatively greater coverage level constraint or pathloss relative to the other UEs 115 (such that the other UEs 115, including the UE 115-*c*, may be able to successfully receive and decode an SCI-2 230 over a relatively smaller set of resources), the UE 115-*a* may include a beta offset update in the SCI-2 230 that is sent over the sPSSCH 250-*a* to reduce the set of resources (such as the set of resource elements) over which the other UEs 115 search for SCI-2 230 in later sPSSCHs 250.

Accordingly, the other UEs 115 may receive and apply the beta offset update and may search for SCI-2 230 that the UE 115-*a* sends over the sPSSCH 250-*b* over the relatively smaller set of resources in accordance with the beta offset update. In some examples, the various beta offsets (or beta offset updates) that the UE 115-*a* may provide via the common SCI-1 and each SCI-2 230 may refer to a change in an amount of resource elements over which receiving UEs 115 search for subsequent SCI-2 transmissions and, as such, a beta offset (or a beta offset update) may be equivalently referred to herein as a resource element offset. Such beta offsets provided multiple times throughout an sPSSCH-based slot via each of multiple SCI-2 transmissions are illustrated by and described in more detail with reference to FIGS. 4 and 5.

Figure 3:
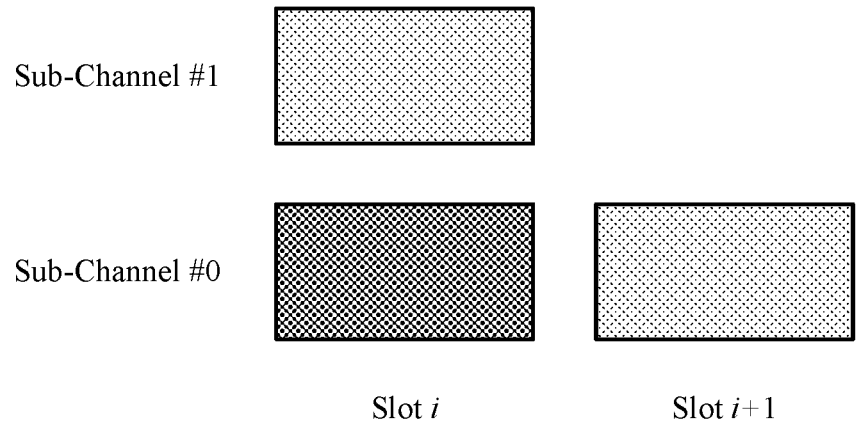
FIG. 3 illustrates an example receiver grouping that supports techniques for sidelink power control and beta offset updates over sPSSCH-based mini-slots.
Figure 3:

FIG. 3 illustrates an example receiver grouping 300 that supports techniques for sidelink power control and beta offset updates over sPSSCH-based mini-slots. The receiver grouping 300 may implement or be implemented to realize aspects of the wireless communications system 100 or the signaling diagram 200. For example, one or more components of a BS 105 or a scheduler of a transmitting UE 115 may employ the receiver grouping 300 to group sets of receiving UEs 115 in accordance with a coverage level constraint or a pathloss associated with each of the receiving UEs 115, and such a BS 105 and UEs 115 may be examples of corresponding devices described herein, including with reference to FIGS. 1 and 2. In some examples, the transmitting UE 115 may select to transmit to UEs 115 within a receiver group 305 (a first receiver group) over a first set of sidelink resources (such as a first one or more subchannels and slots) and may select to transmit to UEs 115 within a receiver group 310 (a second receiver group) over a second set of sidelink resources (such as a second one or more subchannels and slots).

For example, the one or more components of the BS 105 or the transmitting UE 115 (depending on which of such devices functions as a scheduler) may employ the receiver grouping 300 according to pathloss and the transmitting UE 115 may transmit to different receiver groups over different slots or subchannels. As shown in FIG. 3, the transmitting UE 115 may transmit to UEs 115 within the receiver group 305 over a subchannel #0 during a slot i and may transmit to UEs 115 within the receiver group 310 over a subchannel #1 during the slot i as well as over the subchannel #0 during a slot i+1. In some implementations, the one or more components of the BS 105 and the transmitting UE 115 may support control signaling, such as a radio resource control (RRC) information element, that defines or indicates the receiver grouping 300. In such implementations, for example, the one or more components of the BS 105 may transmit, to the transmitting UE 115, control signaling indicating a rule according to which the transmitting UE 115 may perform the receiver grouping 300. Alternatively, the one or more components of the BS 105 may transmit, to the transmitting UE 115, control signaling explicitly indicating the receiver grouping 300 (or otherwise scheduling communication in accordance with the receiver grouping 300).

In some examples, the resources within each one subchannel by one slot resource allocation may include a PSSCH that is divided into a number of sPSSCHs, as illustrated by and described in more detail with reference to FIGS. 2, 4, and 5, and the transmitting UE 115 may transmit to a UE 115 within a receiver group over at least one sPSSCH of the number of sPSSCHs. Further, in some implementations, the common (and conservative) pathloss parameter $PL_{SL}$ that the transmitting UE 115 selects or receives an indication of may be selected or otherwise determined in accordance with the receiver with the largest pathloss (such as in accordance with the receiver that is farthest away) or by some nominal pathloss within a receiver group.

In examples in which the transmitting UE 115 employs an FDM of different receiver groups (such as an FDM of the receiver group 305 and the receiver group 310 during the slot i), the transmitting UE 115 may perform power splitting across (based on) resource blocks. For example, during the slot i, the transmitting UE 115 may split an upper limit capability transmit power or an allocated or selected transmit power across the subchannel #0 and the subchannel #1. In some examples, a total transmit power of the transmitting UE 115 may be capped by an upper limit or maximum transmit power, which may be selected or calculated in accordance with Equation 6, shown below. As shown in Equation 6, k denotes the $k^{th}$ concurrent transmission in the $i^{th}$ transmission occasion.

$$P_{PSSCH}(i) = \min\left(P_{CMAX}, P_{MAX,CBR}, \sum_{k} \min(P_{PSSCH,D}(i, k), P_{PSSCH,SL}(i, k))\right) \quad (6)$$

Figure 4:
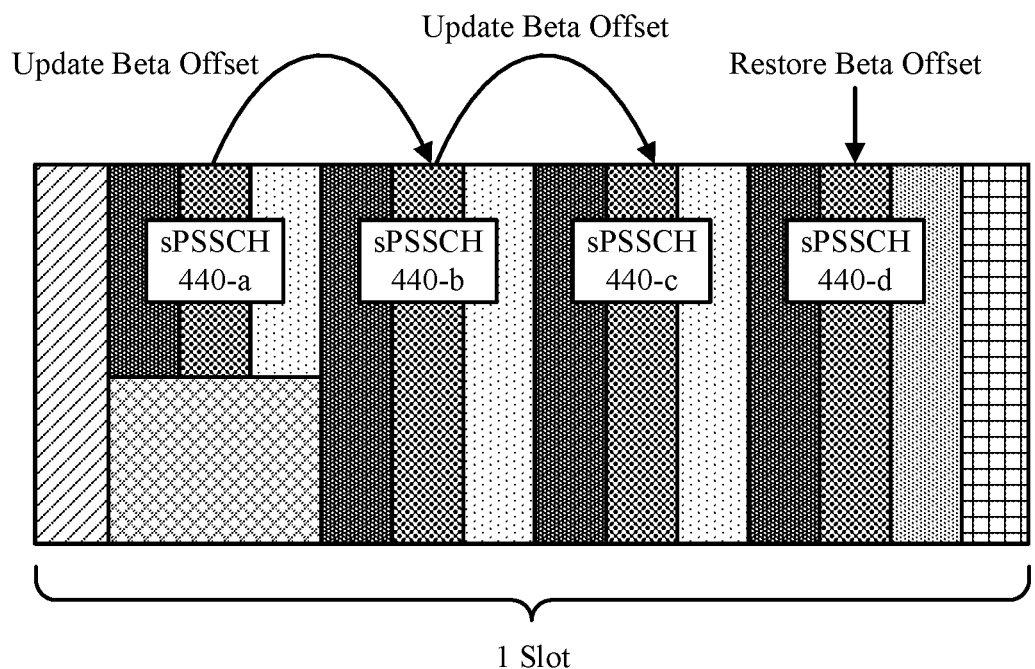
FIGS. 4 and 5 illustrate example sidelink channels that support techniques for sidelink power control and beta offset updates over sPSSCH-based mini-slots.
Figure 4:
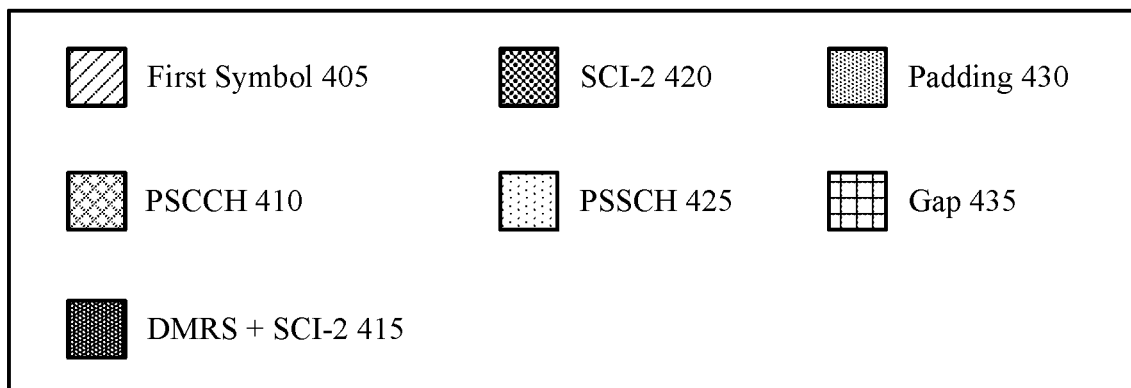

FIG. 4 illustrates an example sidelink channel 400 that supports techniques for sidelink power control and beta offset updates over sPSSCH-based mini-slots. The sidelink channel 400 may implement or be implemented to realize aspects of the wireless communications system 100 or the signaling diagram 200. For example, a transmitting UE 115 may transmit to one or more receiving UEs 115 (such as a set of receiving UEs 115) over multiple sPSSCHs 440 within the sidelink channel 400, and such a transmitting UE 115 and one or more receiving UEs 115 may be examples of corresponding devices described herein, including with reference to FIGS. 1 and 2. In some examples, the transmitting UE 115 may transmit an SCI-2 420 within each sPSSCH 440 and each SCI-2 420 may include a beta offset that the set of receiving UEs 115 may apply for subsequent sPSSCHs 440.

For example, the transmitting UE 115 and the one or more receiving UEs 115 may support an sPSSCH-based design according to which the sidelink channel 400 (which may span one slot) is divided into multiple mini-slots. Such mini-slots may divide a PSSCH 425 of the sidelink channel 400 into multiple sPSSCHs 440 and the UE 115-a may use such PSSCH-based mini-slots for dynamic scheduling. As shown in FIG. 4, the multiple sPSSCHs 440 may include an sPSSCH 440-a, an sPSSCH 440-b, an sPSSCH 440-c, and an sPSSCH 440-d. Further, the sidelink channel 400 may include a first symbol 405 (which some receiving UEs 115 may use to train an AGC or a receive path), a PSCCH 410, DMRS+SCI-2 415 (which may include a multiplexing of DMRS and SCI-2 within a symbol), SCI-2 420 (which may include SCI-2 that is not multiplexed with DMRS), padding 430, and a gap 435. As shown in FIG. 4, each sPSSCH 440 may include one symbol of DMRS+SCI-2 415, one symbol of SCI-2 420, and one symbol of PSSCH 425 (such as data) or padding 430.

In some implementations, the transmitting UE 115 may include a beta offset (which may be equivalently referred to herein as a resource element offset) in a relatively earlier SCI-2 420 to help a receiver update the beta offset for a relatively later SCI-2 420 in a relatively later sPSSCH 440 in the same slot. In other words, an SCI-2 420 may include a beta offset for the SCI-2 in a next sPSSCH 440 (excluding, in some examples, the sPSSCH 440 including padding 430). For example, the transmitting UE 115 may transmit a default beta offset in an SCI-1 sent over the PSCCH 410 and, as a result of receiving and decoding the PSCCH 410, the one or more receiving UEs 115 may select or otherwise identify a first set or quantity of resources (such as a first set of resource elements) over which to search for a first SCI-2 420 over the sPSSCH 440-a. The one or more receiving UEs 115 may receive the first SCI-2 420 sent over the sPSSCH 440-*a* as a result of monitoring over the first set of resources. In some implementations, the transmitting UE 115 may include a first beta offset in the first SCI-2 420 sent over the sPSSCH 440-*a* and the set of receiving UEs 115 may update the first set of resources using the first beta offset to obtain a second set or quantity of resources (such as a second set of resource elements) over which to search for a second SCI-2 420 over the sPSSCH 440-*b*.

The one or more receiving UEs 115 may receive the second SCI-2 420 sent over the sPSSCH 440-*b* as a result of monitoring over the second set of resources. In some implementations, the transmitting UE 115 may include a second beta offset in the second SCI-2 420 sent over the sPSSCH 440-*b* and the one or more receiving UEs 115 may update the second set of resources using the second beta offset to obtain a third set or quantity of resources (such as a third set of resource elements) over which to search for a third SCI-2 420 over the sPSSCH 440-*c*. The one or more receiving UEs 115 may receive the third SCI-2 420 sent over the sPSSCH 440-*c* as a result of monitoring over the third set of resources. In some implementations, the transmitting UE 115 may refrain from including a beta offset in the third SCI-2 420 sent over the sPSSCH 440-*c* as a result of a next or subsequent sPSSCH 440 (the sPSSCH 440-*d*) including the padding 430. In such implementations, the one or more receiving UEs 115 may maintain the third set of resources and search for a fourth SCI-2 420 over the sPSSCH 440-*d* using the third set of resources. Accordingly, in generic terms, the $n^{th}$ sPSSCH 440 may follow a beta offset indicated in SCI-2 420 sent over $(n-1)^{th}$ sPSSCH 440.

In some implementations, the transmitting UE 115 may include, in the fourth SCI-2 420 sent over the sPSSCH 440-*d*, an indication to restore the beta offset to the default beta offset indicated in the SCI-1. As such, the one or more receiving UEs 115 may switch back to searching for SCI-2 420 over the first set or quantity of resources. The indication to restore the beta offset to the default beta offset indicated in the SCI-1 may include a code point. Further, although described in the context of applying a beta offset update to a next or subsequent sPSSCH 440, the transmitting UE 115 may indicate a number of padding or skipping sPSSCHs 440 before the beta offset update is to be applied. For example, along with indicating a beta offset update, the transmitting UE 115 also may indicate when (such as during which sPSSCH 440) the indicated beta offset is to be applied.

In some examples, and to support such a cumulative or sequential updating of the default beta offset provided in the SCI-1 over multiple SCI-2 transmissions within a slot, each receiving UE 115 of the one or more receiving UEs 115 may decode the beta offset updates sent in each of the SCI-2 transmissions. For example, even if an SCI-2 420 is sent over an sPSSCH 440 that is addressed to a different receiving UE 115 than a first receiving UE 115, the first receiving UE 115 may still decode that SCI-2 420 to obtain the beta offset update regardless of any mismatching destination ID. Such a mismatching of destination ID may occur if the SCI-2 420 includes or indicates a different destination ID than a destination ID associated with the first receiving UE 115, which may be likely if the SCI-2 420 is sent over an sPSSCH 440 that is addressed to a different receiving UE 115. In examples in which the beta offset updates provided via SCI-2 420 are cumulative or sequential, each beta offset update may include a relative difference between a current beta offset and a beta offset that is to be applied for a next SCI-2 420 and, as such, a receiving UE 115 may decode each (and all) SCI-2 transmissions from the beginning of the slot to accurately trace the beta offset variations (and if one of the SCI-2 transmissions is missed, the beta offset applied by that receiving UE 115 may be inaccurate). Further, although described herein as a cumulative or sequential updating of the default beta offset provided in the SCI-1 over multiple SCI-2 transmissions, the beta offsets provided via SCI-2 transmissions may alternatively be standalone beta offsets (such that each newly received beta offset replaces an earlier received beta offset).

Further, in some implementations, a receiving UE 115 may not be expected to increase the beta offset as a result of decoding an SCI-2 that the transmitting UE 115 sends using a smaller beta offset. For example, if the receiving UE 115 is associated with a relatively high coverage level constraint, the receiving UE 115 may be unable or unlikely to successfully decode an SCI-2 420 that tries to increase the beta offset for the receiving UE 115 in an upcoming sPSSCH 440 (as the beta offset used for that SCI-2 420 may be too small for the receiving UE 115). In other words, if the receiving UE 115 has a greater minimum beta offset than a beta offset used for an SCI-2 (such as an SCI-2 that indicates an increase to the beta offset to meet the minimum beta offset of the receiving UE 115), the receiving UE 115 may be unable to successfully decode the SCI-2 420 (and therefore may refrain from increasing the beta offset as the SCI-2 420 indicated). Such a lower likelihood for successful SCI-2 420 decoding in scenarios in which an earlier SCI-2 420 indicates an increased beta offset value for a later SCI-2 420 may be associated with a lack of robustness and, as such, the transmitting UE 115 may use beta offset updates via SCI-2 420 as decrements relative to the default beta offset and any other previously applied beta offset updates to avoid such a robustness issue.

As such, in some implementations, the transmitting UE 115 may indicate a beta offset decrement via a relatively earlier SCI-2 420 for a relatively later SCI-2 420 in a relatively later sPSSCH 440, which, if configured as a rule, may save one or more codepoints in SCI-2 420 (as a result of eliminating any possibility that the indicated beta offset value is to be interpreted as a positive value). As a result of avoiding any positive beta offset increments, a set of possible indications from a beta offset update carried in SCI-2 420 may include a delta decrement relative to a previous SCI-2 420, an indication to maintain a previous beta offset indicated in the previous SCI-2 420, or an indication to reset the beta offset to a default value (such as the default beta offset indicated in SCI-1). The delta decrement may be a configured value (such as a higher layer configured value) or the transmitting UE 115 may select the delta in accordance with a condition (such as a coverage level constraint or pathloss) associated with receiving UEs 115 that are yet to be addressed in the slot (such as receiving UEs 115 receiving upcoming sPSSCHs 440).

Additionally, or alternatively, if a later sPSSCH 440 is associated with a relatively larger beta offset than an earlier sPSSCH 440 for some receiving UE 115, the transmitting UE 115 may include a default codepoint to indicate a 'restoring to beta offset indicated by SCI-1' in the relatively earlier sPSSCH 440. Accordingly, and as a default in some implementations, a receiving UE 115 may restore the beta offset to the default beta offset indicated in the SCI-1 if the receiving UE 115 is unable to decode an SCI-2 420 in a previous sPSSCH 440.

Figure 5:
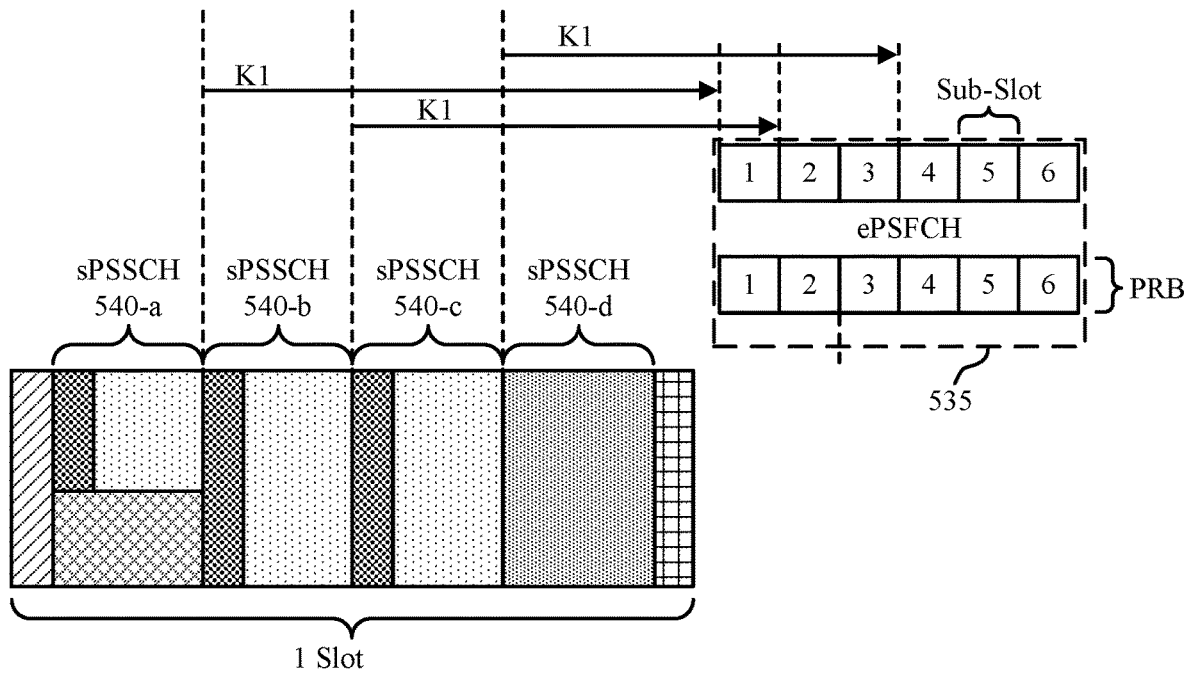
Figure 5:
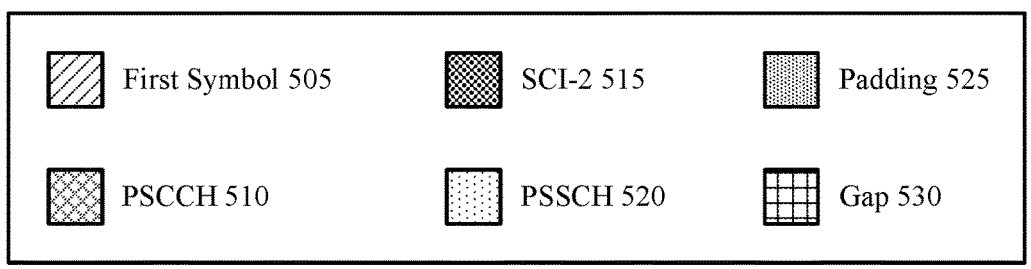

FIG. 5 illustrates an example sidelink channel 500 that supports techniques for sidelink power control and beta offset updates over sPSSCH-based mini-slots. The sidelink channel 500 may implement or be implemented to realize aspects of the wireless communications system 100 or the signaling diagram 200. For example, a transmitting UE 115 may transmit to one or more receiving UEs 115 (such as a set of receiving UEs 115) over multiple sPSSCHs 540 within the sidelink channel 500, and such a transmitting UE 115 and one or more receiving UEs 115 may be examples of corresponding devices described herein, including with reference to FIGS. 1 and 2. In some examples, the transmitting UE 115 may transmit an SCI-2 515 within each sPSSCH 540. Each SCI-2 515 may include a beta offset that the set of receiving UEs 115 may apply for one or more subsequent sPSSCHs 540 as well as a K1 value associated with a resource of an ePSFCH 535 for feedback associated with the sPSSCH 540 corresponding to that SCI-2 515.

For example, the transmitting UE 115 and the one or more receiving UEs 115 may support an sPSSCH-based design according to which the sidelink channel 500 (which may span one slot) is divided into multiple mini-slots. Such mini-slots may divide a PSSCH 520 of the sidelink channel 500 into multiple sPSSCHs 540 and the transmitting UE 115 may use such PSSCH-based mini-slots for dynamic scheduling. As shown in FIG. 5, the multiple sPSSCHs 540 may include an sPSSCH 540-*a*, an sPSSCH 540-*b*, an sPSSCH 540-*c*, and an sPSSCH 540-*d*. Further, the sidelink channel 500 may include a first symbol 505 (which some receiving UEs 115 may use to train an AGC or a receive path), a PSCCH 510, padding 525, and a gap 530.

The transmitting UE 115 may transmit to a number of receiving UEs 115 over the sidelink channel 500 and, in some examples, may transmit to a different receiving UE 115 over each sPSSCH 540. In such examples, the transmitting UE 115 may transmit to a first receiving UE 115 over an sPSSCH 540-*a*, to a second receiving UE 115 over an sPSSCH 540-*b*, and to a third receiving UE 115 over an sPSSCH 540-*c*. In some examples, the sPSSCH 540-*d* may include padding 525 and, as such, the transmitting UE 115 may refrain from transmitting to a receiving UE 115 over the sPSSCH 540-*d*. In some implementations, the transmitting UE 115 may include a K1 value in the SCI-2 515 provided over each sPSSCH 540 that indicates a resource over which an addressed receiving UE 115 may transmit feedback associated with that sPSSCH 540.

For example, and as shown in FIG. 5, the SCI-2 515 that the transmitting UE 115 sends over the sPSSCH 540-*a* may include a K1 value indicating a first resource (such as a sub-slot or a physical resource block (PRB), or both) of the ePSFCH 535 and, accordingly, the first receiving UE 115 may transmit feedback associated with the sPSSCH 540-*a* over the indicated first resource. Similarly, the SCI-2 515 that the transmitting UE 115 sends over the sPSSCH 540-*b* may include a K1 value indicating a second resource (such as a sub-slot or a PRB, or both) of the ePSFCH 535 and, accordingly, the second receiving UE 115 may transmit feedback associated with the sPSSCH 540-*b* over the indicated second resource. Further, the SCI-2 515 that the transmitting UE 115 sends over the sPSSCH 540-*c* also may include a K1 value indicating a third resource (such as a sub-slot or a PRB, or both) of the ePSFCH 535 and, accordingly, the third receiving UE 115 may transmit feedback associated with the sPSSCH 540-*c* over the indicated third resource.

Figure 6:
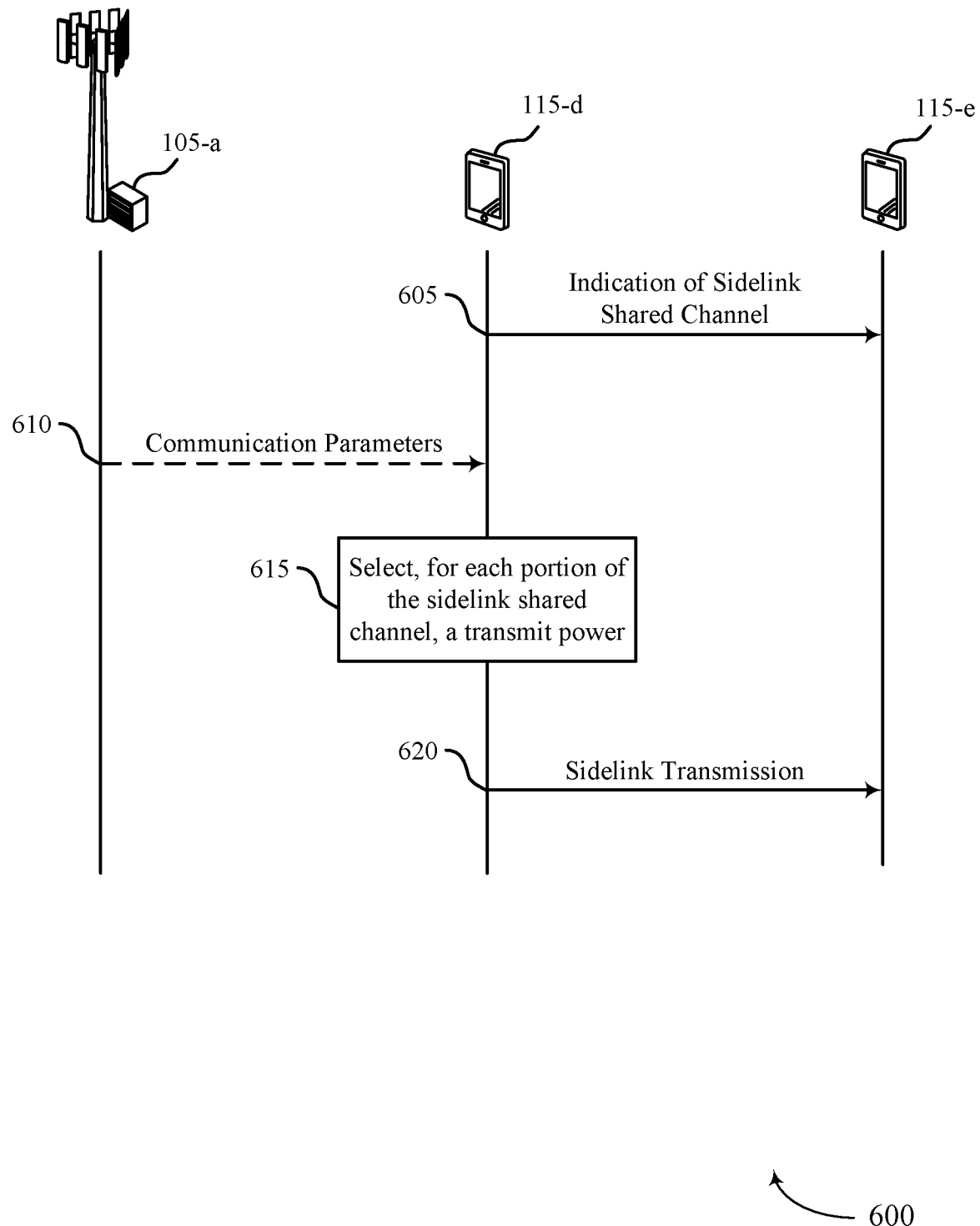
FIG. 6 illustrates an example process flow that supports techniques for sidelink power control and beta offset updates over sPSSCH-based mini-slots.

FIG. 6 illustrates an example process flow 600 that supports techniques for sidelink power control and beta offset updates over sPSSCH-based mini-slots. The process flow 600 may implement or be implemented to realize aspects of the wireless communications system 100 or the signaling diagram 200. For example, the process flow 600 illustrates communication between one or more components of a BS 105-*a*, a UE 115-*d*, and a UE 115-*e*, which may be examples of corresponding devices descried herein, including with reference to FIGS. 1 and 2. In some implementations, the UE 115-*d* may transmit sidelink communication to the UE 115-*e* over a PSSCH that is partitioned into multiple sPSSCHs and may select a transmit power and a beta offset for each sPSSCH of the multiple sPSSCHs.

In the following description of the process flow 600, the operations may be performed (for example, reported or provided) in a different order than the order shown, or the operations performed by the UE 115-*d*, the UE 115-*e*, and the one or more components of the BS 105-*a* may be performed in different orders or at different times. For example, specific operations also may be left out of the process flow 600, or other operations may be added to the process flow 600. Further, although some operations or signaling may be shown to occur at different times for discussion purposes, these operations may actually occur at the same time.

At 605, the UE 115-*d* may transmit, to a set of receiving UEs 115 (including the UE 115-*e*) over a sidelink control channel, an indication of a sidelink shared channel within a slot. In some examples, the slot may be partitioned into multiple portions or mini-slots. For example, the UE 115-*d* may indicate, via the sidelink control channel, an sPSSCH mini-slot pattern according to which a PSSCH is partitioned or divided into multiple sPSSCHs. Additional details relating to such an indication of an sPSSCH mini-slot pattern are illustrated by and described in more detail with reference to FIGS. 2, 4, and 5.

At 610, the UE 115-*d* may, in some implementations, receive an indication of one or more communication parameters that are associated with the sidelink shared channel and that are common to the set of receiving UEs 115. For example, the UE 115-*d* may receive an indication of a nominal sidelink power parameter and a resource block parameter (such as a resource block allocation parameter) that are common for each portion of the sidelink shared channel (such as common for each sPSSCH). Additionally, in some examples, the UE 115-*d* may receive an indication of a nominal pathloss parameter that is common for the set of receiving UEs. In some examples, the UE 115-*d* may receive indications of such communication parameters from one or more components of the BS 105-*a* as part of an open loop power control procedure.

At 615, the UE 115-*d* may select, for each portion of the sidelink shared channel (such as for each sPSSCH), a transmit power using the one or more communication parameters that are associated with the sidelink shared channel and that are common to the set of receiving UEs 115. In some examples, the UE 115-*d* may select a common transmit power for each (all) portions of the sidelink shared channel in accordance with the one or more common communication parameters and may transmit over each portion using the common transmit power. In some other examples, the UE 115-*d* may independently select a transmit power for each portion of the sidelink shared channel using the one or more communication parameters that are common to the set of receiving UEs 115 in addition to using pathloss parameters that are specific to each of the set of receiving UEs 115. In such examples, the UE 115-*d* may use the one or more common communication parameters to select, calculate, or otherwise determine a nominal transmit power and may use the nominal transit power to find common upper and lower bound transmit powers for the multiple portions of the sidelink shared channel. The UE 115-*d* may select, calculate, or otherwise determine a second transmit power for each portion using an actual pathloss parameter associated with that portion, compare the second transmit power to the upper and lower bound transmit powers, and select one of the lower bound transmit power, the second transmit power, or the upper bound transmit power as an actual transmit power for that portion of the sidelink shared channel in accordance with the comparison.

At 620, the UE 115-d may transmit, to each UE 115 of the set of receiving UEs 115 (including the UE 115-e) over the sidelink shared channel, in accordance with the transmit power selected for each portion of the sidelink shared channel. In some examples, the UE 115-d may include a default beta offset in SCI-1 and may indicate a beta offset update in an SCI-2 of each portion of the sidelink shared channel. Additional details relating to such a beta offset update provided via SCI-2 are described herein, including with reference to FIG. 4.

Figure 7:
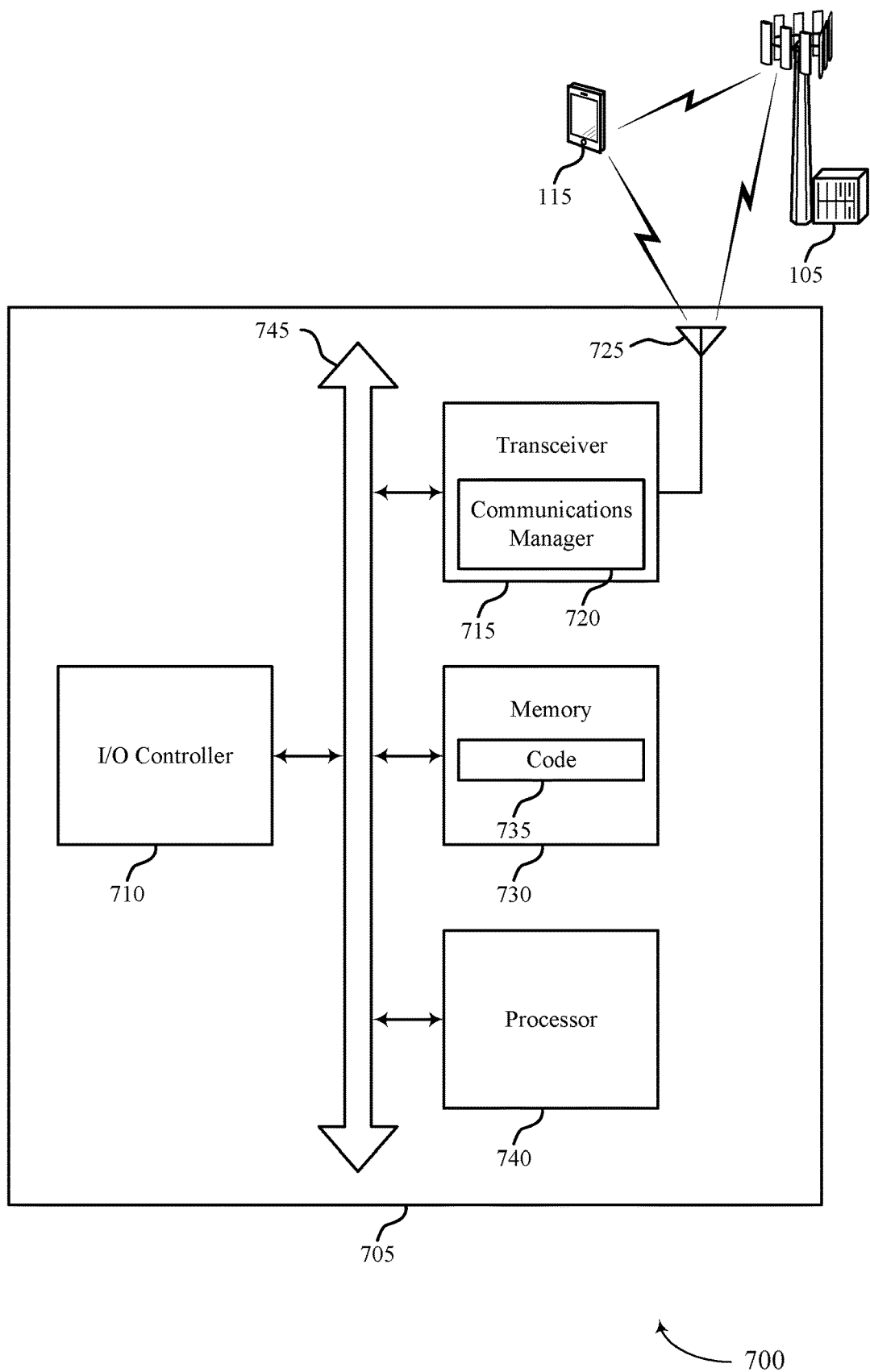
FIG. 7 shows a bock diagram of an example device that supports techniques for sidelink power control and beta offset updates over sPSSCH-based mini-slots.

FIG. 7 shows a block diagram 700 of an example device 705 that supports techniques for sidelink power control and beta offset updates over sPSSCH-based mini-slots. The device 705 may communicate wirelessly with one or more BSs 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as operatively, communicatively, functionally, electronically, electrically) via one or more buses (such as a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725. In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations based on received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (for example, the processor 740, or the memory 730, or both), may be included in a chip or chip assembly that is installed in the device 705.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The communications manager 720 may support wireless communication at a UE in accordance with examples as disclosed herein. For example, the communications manager 720 may be configured as or otherwise support a means for transmitting, to a set of receiving UEs over a sidelink control channel, an indication of a sidelink shared channel within a slot, where the slot is partitioned into a set of multiple portions. The communications manager 720 may be configured as or otherwise support a means for selecting, for each portion of the sidelink shared channel, a transmit power using one or more communication parameters that are associated with the sidelink shared channel and that are common to the set of receiving UEs. The communications manager 720 may be configured as or otherwise support a means for transmitting, to each UE of the set of receiving UEs over the sidelink shared channel, in accordance with the transmit power selected for each portion of the sidelink shared channel.

In some examples, the communications manager 720 may be configured as or otherwise support a means for receiving an indication of a nominal sidelink power parameter and a resource block parameter that are common for each portion of the sidelink shared channel, where the transmit power for each portion of the sidelink shared channel is selected using the nominal sidelink power parameter and the resource block parameter that are common for each portion of the sidelink shared channel.

In some examples, the communications manager 720 may be configured as or otherwise support a means for receiving an indication of a nominal pathloss parameter that is common for the set of receiving UEs, where the transmit power for each portion of the sidelink shared channel is selected using the nominal sidelink power parameter, the resource block parameter, and the nominal pathloss parameter that is common for the set of receiving UEs.

In some examples, the communications manager 720 may be configured as or otherwise support a means for receiving an indication of a nominal pathloss parameter that is common for the set of receiving UEs. In some examples, to select the transmit power for each portion of the sidelink shared channel, the communications manager 720 may be configured as or otherwise support a means for selecting a nominal transmit power for the sidelink shared channel using the nominal sidelink power parameter, the resource block parameter, and the nominal pathloss parameter and the communications manager 720 may be configured as or otherwise support a means for selecting, for each portion of the sidelink shared channel, a second transmit power using the nominal sidelink power parameter, the resource block parameter, and an actual pathloss parameter associated with each UE of the set of receiving UEs.

In some examples, the communications manager 720 may be configured as or otherwise support a means for comparing the second transmit power for each portion of the sidelink shared channel with a lower bound transmit power and an upper bound transmit power, where the lower bound transmit power and the upper bound transmit power are defined relative to the nominal transmit power. In some examples, to select the transmit power for each portion of the sidelink shared channel, the communications manager 720 may be configured as or otherwise support a means for selecting the lower bound transmit power if the second transmit power for that portion of the sidelink shared channel is less than the lower bound transmit power, the communications manager 720 may be configured as or otherwise support a means for selecting the second transmit power if the second transmit power for that portion of the sidelink shared channel is greater than or equal to the lower bound transmit power and less than or equal to the upper bound transmit power, and the communications manager 720 may be configured as or otherwise support a means for selecting the upper bound transmit power if the second transmit power for that portion of the sidelink shared channel is greater than the upper bound transmit power.

In some examples, the communications manager 720 may be configured as or otherwise support a means for grouping a set of multiple receiving UEs into multiple sets of receiving UEs in accordance with a pathloss parameter associated with each of the set of multiple receiving UEs, where each set of the multiple sets of receiving UEs includes UEs associated with pathloss parameters within a threshold range of each other, and where the multiple sets of receiving UEs include the set of receiving UEs. In some examples, the communications manager 720 may be configured as or otherwise support a means for selecting, for communication within the slot, the set of receiving UEs as a result of grouping the set of multiple receiving UEs into the multiple sets of receiving UEs.

In some examples, transmitting to the set of receiving UEs via the sidelink control channel further includes transmitting SCI-1, the SCI-1 indicating a default resource element offset associated with multiple SCI-2 transmissions. In some examples, transmitting to each UE of the set of receiving UEs over the sidelink shared channel further includes transmitting a different SCI-2 over each portion of the sidelink shared channel, where each different SCI-2 indicates a resource element offset associated with one or more subsequent SCI-2 transmissions over one or more subsequent portions of the sidelink shared channel.

In some examples, to support transmitting the different SCI-2 over each portion of the sidelink shared channel, the communications manager 720 may be configured as or otherwise support a means for transmitting a first SCI-2 over a first portion of the sidelink shared channel, the first SCI-2 indicating a first resource element offset associated with a second SCI-2 to be transmitted over a second portion of the sidelink shared channel. In some examples, to support transmitting the different SCI-2 over each portion of the sidelink shared channel, the communications manager 720 may be configured as or otherwise support a means for transmitting the second SCI-2 over the second portion of the sidelink shared channel, the second SCI-2 indicating a second resource element offset associated with a third SCI-2 to be transmitted over a third portion of the sidelink shared channel.

In some examples, the resource element offset indicated in each different SCI-2 includes a delta decrement relative to a previous resource element offset, an indication to maintain the previous resource element offset, or an indication to reset to the default resource element offset indicated in the SCI-1.

In some examples, to support transmitting to each UE of the set of receiving UEs over the sidelink shared channel, the communications manager 720 may be configured as or otherwise support a means for transmitting to a different UE of the set of receiving UEs over each portion of the sidelink shared channel.

Additionally, or alternatively, the communications manager 720 may support wireless communication at a UE in accordance with examples as disclosed herein. For example, the communications manager 720 may be configured as or otherwise support a means for receiving, via an SCI-1 transmission, an indication of a sidelink shared channel within a slot and an indication of a default resource element offset associated with multiple SCI-2 transmissions, where the slot is partitioned into a set of multiple portions. The communications manager 720 may be configured as or otherwise support a means for receiving a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel. The communications manager 720 may be configured as or otherwise support a means for receiving the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

In some examples, the communications manager 720 may be configured as or otherwise support a means for decoding the first SCI-2 transmission over a first set of resource elements in accordance with the default resource element offset indicated in the SCI-1 transmission. In some examples, the communications manager 720 may be configured as or otherwise support a means for decoding the second SCI-2 transmission over a second set of resource elements in accordance with the default resource element offset indicated in the SCI-1 transmission and the first resource element offset indicated in the first SCI-2 transmission.

In some examples, the communications manager 720 may be configured as or otherwise support a means for updating a set of resource elements allocated for the first SCI-2 transmission according to the default resource element offset indicated in the SCI-1 transmission to obtain the first set of resource elements. In some examples, the communications manager 720 may be configured as or otherwise support a means for updating the first set of resource elements according to the first resource element offset indicated in the first SCI-2 transmission to obtain the second set of resource elements.

In some examples, the communications manager 720 may be configured as or otherwise support a means for detecting that one or both of the first SCI-2 transmission or the second SCI-2 transmission is encoded with a destination identifier associated with the UE as a result of decoding the first SCI-2 transmission and decoding the second SCI-2 transmission. In some examples, the communications manager 720 may be configured as or otherwise support a means for receiving a data transmission over one or both of the first portion of the sidelink shared channel or the second portion of the sidelink shared channel in accordance with detecting that one or both of the first SCI-2 transmission or the second SCI-2 transmission is encoded the destination identifier associated with the UE.

In some examples, a resource element offset indicated by an SCI-2 transmission includes a delta decrement relative to a previous resource element offset, an indication to maintain the previous resource element offset, or an indication to reset to the default resource element offset indicated in the SCI-1 transmission.

In some implementations, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for sidelink power control and beta offset updates over sPSSCH-based mini-slots as described herein, or the processor 740 and the memory 730 may be otherwise configured to perform or support such operations.

Figure 8:
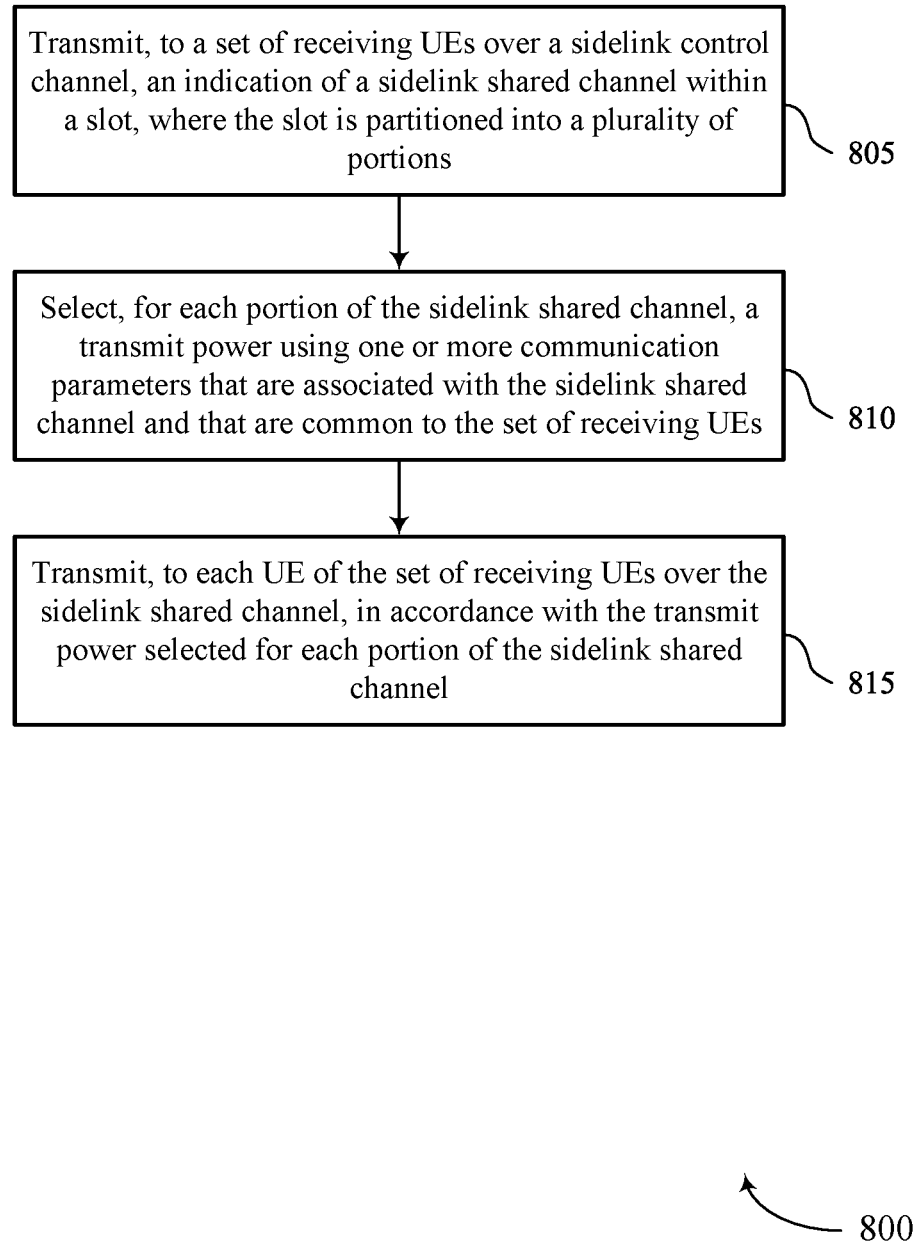
FIGS. 8 and 9 show flowcharts illustrating example methods that support techniques for sidelink power control and beta offset updates over sPSSCH-based mini-slots.

FIG. 8 shows a flowchart illustrating an example method 800 that supports techniques for sidelink power control and beta offset updates over sPSSCH-based mini-slots. The operations of the method 800 may be implemented by a UE or its components as described herein. For example, the operations of the method 800 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 805, the method may include transmitting, to a set of receiving UEs over a sidelink control channel, an indication of a sidelink shared channel within a slot, where the slot is partitioned into a set of multiple portions. The operations of 805 may be performed in accordance with examples as disclosed herein. In some examples, aspects of the operations of 805 may be performed by a communications manager 720 as described with reference to FIG. 7.

At 810, the method may include selecting, for each portion of the sidelink shared channel, a transmit power using one or more communication parameters that are associated with the sidelink shared channel and that are common to the set of receiving UEs. The operations of 810 may be performed in accordance with examples as disclosed herein. In some examples, aspects of the operations of 810 may be performed by a communications manager 720 as described with reference to FIG. 7.

At 815, the method may include transmitting, to each UE of the set of receiving UEs over the sidelink shared channel, in accordance with the transmit power selected for each portion of the sidelink shared channel. The operations of 815 may be performed in accordance with examples as disclosed herein. In some examples, aspects of the operations of 815 may be performed by a communications manager 720 as described with reference to FIG. 7.

Figure 9:
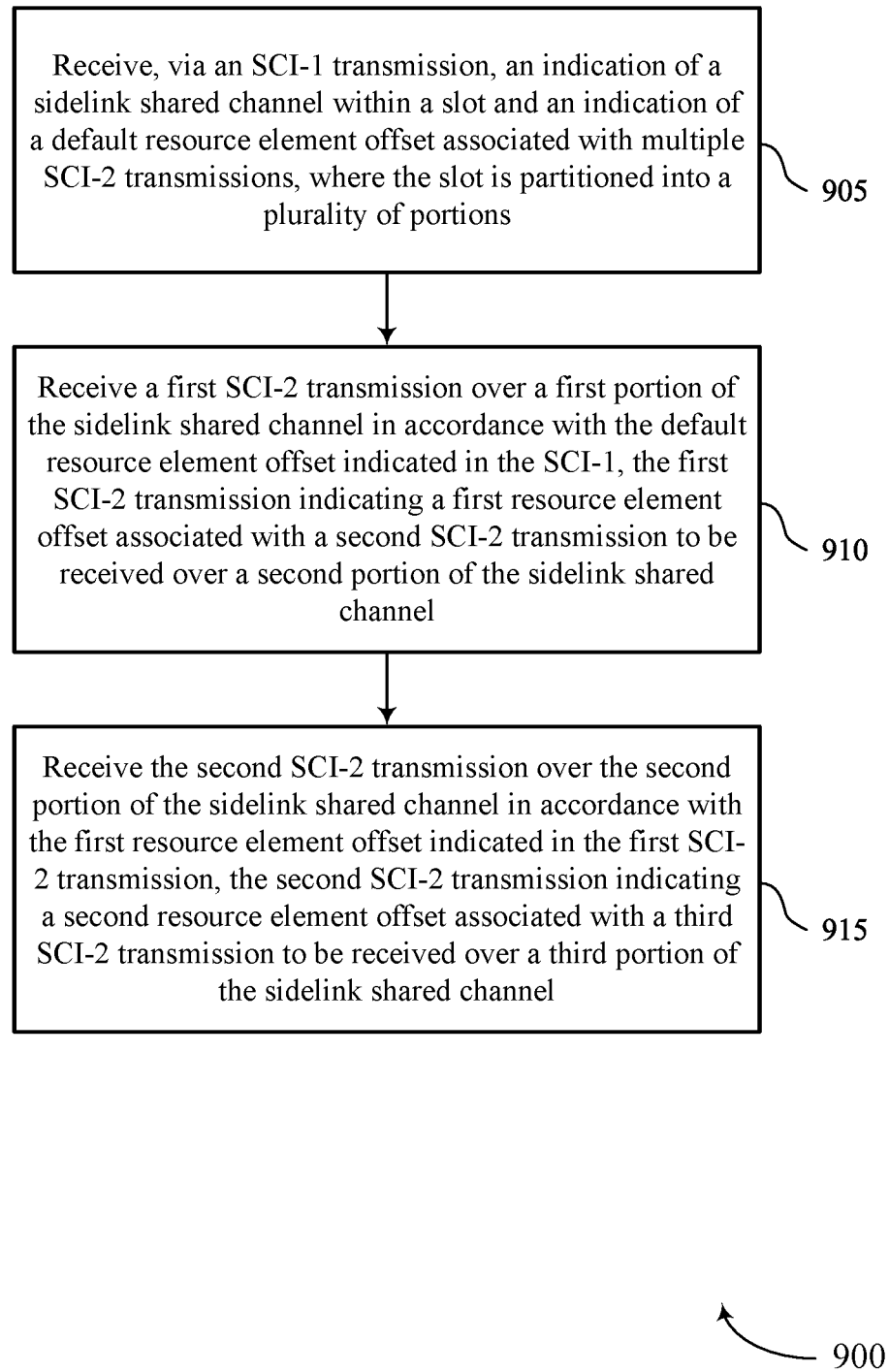

FIG. 9 shows a flowchart illustrating an example method 900 that supports techniques for sidelink power control and beta offset updates over sPSSCH-based mini-slots. The operations of the method 900 may be implemented by a UE or its components as described herein. For example, the operations of the method 900 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 905, the method may include receiving, via an SCI-1 transmission, an indication of a sidelink shared channel within a slot and an indication of a default resource element offset associated with multiple SCI-2 transmissions, where the slot is partitioned into a set of multiple portions. The operations of 905 may be performed in accordance with examples as disclosed herein. In some examples, aspects of the operations of 905 may be performed by a communications manager 720 as described with reference to FIG. 7.

At 910, the method may include receiving a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel. The operations of 910 may be performed in accordance with examples as disclosed herein. In some examples, aspects of the operations of 910 may be performed by a communications manager 720 as described with reference to FIG. 7.

At 915, the method may include receiving the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel. The operations of 915 may be performed in accordance with examples as disclosed herein. In some examples, aspects of the operations of 915 may be performed by a communications manager 720 as described with reference to FIG. 7.

The following provides an overview of some aspects of the present disclosure:

Aspect 1: A method for wireless communication at a UE, including: transmitting, to a set of receiving UEs over a sidelink control channel, an indication of a sidelink shared channel within a slot, where the slot is partitioned into a plurality of portions; selecting, for each portion of the sidelink shared channel, a transmit power using one or more communication parameters that are associated with the sidelink shared channel and that are common to the set of receiving UEs; and transmitting, to each UE of the set of receiving UEs over the sidelink shared channel, in accordance with the transmit power selected for each portion of the sidelink shared channel.

Aspect 2: The method of aspect 1, further including: receiving an indication of a nominal sidelink power parameter and a resource block parameter that are common for each portion of the sidelink shared channel, where the transmit power for each portion of the sidelink shared channel is selected using the nominal sidelink power parameter and the resource block parameter that are common for each portion of the sidelink shared channel.

Aspect 3: The method of aspect 2, further including: receiving an indication of a nominal pathloss parameter that is common for the set of receiving UEs, where the transmit power for each portion of the sidelink shared channel is selected using the nominal sidelink power parameter, the resource block parameter, and the nominal pathloss parameter that is common for the set of receiving UEs.

Aspect 4: The method of aspect 2, further including: receiving an indication of a nominal pathloss parameter that is common for the set of receiving UEs, and where selecting the transmit power for each portion of the sidelink shared channel includes: selecting a nominal transmit power for the sidelink shared channel using the nominal sidelink power parameter, the resource block parameter, and the nominal pathloss parameter; and selecting, for each portion of the sidelink shared channel, a second transmit power using the nominal sidelink power parameter, the resource block parameter, and an actual pathloss parameter associated with each UE of the set of receiving UEs.

Aspect 5: The method of aspect 4, further including: comparing the second transmit power for each portion of the sidelink shared channel with a lower bound transmit power and an upper bound transmit power, where the lower bound transmit power and the upper bound transmit power are defined relative to the nominal transmit power, and where selecting the transmit power for each portion of the sidelink shared channel includes: selecting the lower bound transmit power if the second transmit power for that portion of the sidelink shared channel is less than the lower bound transmit power; selecting the second transmit power if the second transmit power for that portion of the sidelink shared channel is greater than or equal to the lower bound transmit power and less than or equal to the upper bound transmit power; or selecting the upper bound transmit power if the second transmit power for that portion of the sidelink shared channel is greater than the upper bound transmit power.

Aspect 6: The method of any of aspects 1-5, further including: grouping a plurality of receiving UEs into multiple sets of receiving UEs in accordance with a pathloss parameter associated with each of the plurality of receiving UEs, where each set of the multiple sets of receiving UEs includes UEs associated with pathloss parameters within a threshold range of each other, and where the multiple sets of receiving UEs include the set of receiving UEs; and selecting, for communication within the slot, the set of receiving UEs as a result of grouping the plurality of receiving UEs into the multiple sets of receiving UEs.

Aspect 7: The method of any of aspects 1-6, where transmitting to the set of receiving UEs via the sidelink control channel further includes transmitting SCI-1, the SCI-1 indicating a default resource element offset associated with multiple SCI-2 transmissions; and transmitting to each UE of the set of receiving UEs over the sidelink shared channel further includes transmitting a different SCI-2 over each portion of the sidelink shared channel, where each different SCI-2 indicates a resource element offset associated with one or more subsequent SCI-2 transmissions over one or more subsequent portions of the sidelink shared channel.

Aspect 8: The method of aspect 7, where transmitting the different SCI-2 over each portion of the sidelink shared channel further includes: transmitting a first SCI-2 over a first portion of the sidelink shared channel, the first SCI-2 indicating a first resource element offset associated with a second SCI-2 to be transmitted over a second portion of the sidelink shared channel; and transmitting the second SCI-2 over the second portion of the sidelink shared channel, the second SCI-2 indicating a second resource element offset associated with a third SCI-2 to be transmitted over a third portion of the sidelink shared channel.

Aspect 9: The method of any of aspects 7 or 8, where the resource element offset indicated in each different SCI-2 includes a delta decrement relative to a previous resource element offset, an indication to maintain the previous resource element offset, or an indication to reset to the default resource element offset indicated in the SCI-1.

Aspect 10: The method of any of aspects 1-9, where transmitting to each UE of the set of receiving UEs over the sidelink shared channel further includes: transmitting to a different UE of the set of receiving UEs over each portion of the sidelink shared channel.

Aspect 11: A method for wireless communication at a UE, including: receiving, via an SCI-1 transmission, an indication of a sidelink shared channel within a slot and an indication of a default resource element offset associated with multiple SCI-2 transmissions, where the slot is partitioned into a plurality of portions; receiving a first SCI-2 transmission over a first portion of the sidelink shared channel in accordance with the default resource element offset indicated in the SCI-1, the first SCI-2 transmission indicating a first resource element offset associated with a second SCI-2 transmission to be received over a second portion of the sidelink shared channel; and receiving the second SCI-2 transmission over the second portion of the sidelink shared channel in accordance with the first resource element offset indicated in the first SCI-2 transmission, the second SCI-2 transmission indicating a second resource element offset associated with a third SCI-2 transmission to be received over a third portion of the sidelink shared channel.

Aspect 12: The method of aspect 11, further including: decoding the first SCI-2 transmission over a first set of resource elements in accordance with the default resource element offset indicated in the SCI-1 transmission; and decoding the second SCI-2 transmission over a second set of resource elements in accordance with the default resource element offset indicated in the SCI-1 transmission and the first resource element offset indicated in the first SCI-2 transmission.

Aspect 13: The method of aspect 12, further including: updating a set of resource elements allocated for the first SCI-2 transmission according to the default resource element offset indicated in the SCI-1 transmission to obtain the first set of resource elements; and updating the first set of resource elements according to the first resource element offset indicated in the first SCI-2 transmission to obtain the second set of resource elements.

Aspect 14: The method of any of aspects 12 or 13, further including: detecting that one or both of the first SCI-2 transmission or the second SCI-2 transmission is encoded with a destination identifier associated with the UE as a result of decoding the first SCI-2 transmission and decoding the second SCI-2 transmission; and receiving a data transmission over one or both of the first portion of the sidelink shared channel or the second portion of the sidelink shared channel in accordance with detecting that one or both of the first SCI-2 transmission or the second SCI-2 transmission is encoded the destination identifier associated with the UE.

Aspect 15: The method of any of aspects 11-14, where a resource element offset indicated by an SCI-2 transmission includes a delta decrement relative to a previous resource element offset, an indication to maintain the previous resource element offset, or an indication to reset to the default resource element offset indicated in the SCI-1 transmission.

Aspect 16: An apparatus for wireless communication at a UE, including at least a first interface, a processing system, and a second interface configured to cause the apparatus to perform a method of any of aspects 1-10.

Aspect 17: An apparatus for wireless communication at a UE, including a processor; memory coupled with the processor; and instructions stored in the memory and executable by the processor to cause the apparatus to perform a method of any of aspects 1-10.

Aspect 18: An apparatus for wireless communication at a UE, including at least one means for performing a method of any of aspects 1-10.

Aspect 19: A non-transitory computer-readable medium storing code for wireless communication at a UE, the code including instructions executable by a processor to perform a method of any of aspects 1-10.

Aspect 20: An apparatus for wireless communication at a UE, including at least a first interface, a processing system, and a second interface configured to cause the apparatus to perform a method of any of aspects 11-15.

Aspect 21: An apparatus for wireless communication at a UE, including a processor; memory coupled with the processor; and instructions stored in the memory and executable by the processor to cause the apparatus to perform a method of any of aspects 11-15.

Aspect 22: An apparatus for wireless communication at a UE, including at least one means for performing a method of any of aspects 11-15.

Aspect 23: A non-transitory computer-readable medium storing code for wireless communication at a UE, the code including instructions executable by a processor to perform a method of any of aspects 11-15.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Some features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:
   a first interface configured to:
      output, to a set of receiving UEs over a sidelink control channel, an indication of a sidelink shared channel within a slot, the sidelink shared channel being partitioned into a plurality of portions within the slot;
   a second interface configured to:
      obtain an indication of a nominal sidelink power parameter and a resource block parameter that are common for each portion of the sidelink shared channel and an indication of a nominal pathloss parameter that is common for the set of receiving UEs;
   a processing system configured to:
      select, for each portion of the sidelink shared channel, a transmit power using one or more communication parameters that are associated with the sidelink shared channel and that are common to the set of receiving UEs, the selecting the transmit power for each portion of the sidelink shared channel being in accordance with a lower bound transmit power and an upper bound transmit power and comprising:
         selecting a nominal transmit power for the sidelink shared channel using the nominal sidelink power parameter, the resource block parameter, and the nominal pathloss parameter; and
         selecting, for each portion of the sidelink shared channel, a second transmit power using the nominal sidelink power parameter, the resource block parameter, and an actual pathloss parameter associated with each UE of the set of receiving UEs; and
   the first interface configured to:
      output, to each UE of the set of receiving UEs over the sidelink shared channel, in accordance with the transmit power selected for each portion of the partitioned sidelink shared channel, the outputting to each UE of the set of receiving UEs over the sidelink shared channel further comprising outputting to a different UE of the set of receiving UEs over each portion of the partitioned sidelink shared channel.

2. The apparatus of claim 1, wherein the processing system is further configured to:
   compare the second transmit power for each portion of the sidelink shared channel with the lower bound transmit power and the upper bound transmit power, the lower bound transmit power and the upper bound transmit power being defined relative to the nominal transmit power, and wherein selecting the transmit power for each portion of the sidelink shared channel further comprises:
      selecting the lower bound transmit power if the second transmit power for that portion of the sidelink shared channel is less than the lower bound transmit power;
      selecting the second transmit power if the second transmit power for that portion of the sidelink shared channel is greater than or equal to the lower bound transmit power and less than or equal to the upper bound transmit power; or
      selecting the upper bound transmit power if the second transmit power for that portion of the sidelink shared channel is greater than the upper bound transmit power.

3. The apparatus of claim 1, wherein the processing system is further configured to:
   group a plurality of receiving UEs into multiple sets of receiving UEs in accordance with a pathloss parameter associated with each of the plurality of receiving UEs, each set of the multiple sets of receiving UEs including UEs associated with pathloss parameters within a threshold range of each other, and the multiple sets of receiving UEs including the set of receiving UEs; and select, for communication within the slot, the set of receiving UEs as a result of grouping the plurality of receiving UEs into the multiple sets of receiving UEs.

4. The apparatus of claim 1, wherein:
outputting to the set of receiving UEs via the sidelink control channel further comprises:
   outputting sidelink control information (SCI) part one (SCI-1), the SCI-1 indicating a default resource element offset associated with multiple SCI part two (SCI-2) transmissions; and
outputting to each UE of the set of receiving UEs over the sidelink shared channel further comprises:
   outputting a different SCI-2 over each portion of the sidelink shared channel, wherein each different SCI-2 indicates a resource element offset associated with one or more subsequent SCI-2 transmissions over one or more subsequent portions of the sidelink shared channel.

5. The apparatus of claim 4, wherein outputting the different SCI-2 over each portion of the sidelink shared channel further comprises:
   outputting a first SCI-2 over a first portion of the sidelink shared channel, the first SCI-2 indicating a first resource element offset associated with a second SCI-2 to be output over a second portion of the sidelink shared channel; and
   outputting the second SCI-2 over the second portion of the sidelink shared channel, the second SCI-2 indicating a second resource element offset associated with a third SCI-2 to be output over a third portion of the sidelink shared channel.

6. The apparatus of claim 4, wherein the resource element offset indicated in each different SCI-2 comprises a delta decrement relative to a previous resource element offset, an indication to maintain the previous resource element offset, or an indication to reset to the default resource element offset indicated in the SCI-1.

7. The apparatus of claim 1, wherein the lower bound transmit power and the upper bound transmit power are defined relative to the nominal transmit power.

8. A method for wireless communication at a user equipment (UE), comprising:
   transmitting, to a set of receiving UEs over a sidelink control channel, an indication of a sidelink shared channel within a slot, the sidelink shared channel being partitioned into a plurality of portions within the slot;
   receiving an indication of a nominal sidelink power parameter and a resource block parameter that are common for each portion of the sidelink shared channel and an indication of a nominal pathloss parameter that is common for the set of receiving UEs;
   selecting, for each portion of the sidelink shared channel, a transmit power using one or more communication parameters that are associated with the sidelink shared channel and that are common to the set of receiving UEs, the selecting the transmit power for each portion of the sidelink shared channel being in accordance with a lower bound transmit power and an upper bound transmit power and comprising:
      selecting a nominal transmit power for the sidelink shared channel using the nominal sidelink power parameter, the resource block parameter, and the nominal pathloss parameter; and
      selecting, for each portion of the sidelink shared channel, a second transmit power using the nominal sidelink power parameter, the resource block parameter, and an actual pathloss parameter associated with each UE of the set of receiving UEs; and
   transmitting, to each UE of the set of receiving UEs over the sidelink shared channel, in accordance with the transmit power selected for each portion of the partitioned sidelink shared channel, the transmitting to each UE of the set of receiving UEs over the sidelink shared channel further comprising transmitting to a different UE of the set of receiving UEs over each portion of the partitioned sidelink shared channel.

9. The method of claim 8, further comprising:
comparing the second transmit power for each portion of the sidelink shared channel with the lower bound transmit power and the upper bound transmit power, the lower bound transmit power and the upper bound transmit power being defined relative to the nominal transmit power, and wherein selecting the transmit power for each portion of the sidelink shared channel comprises:
   selecting the lower bound transmit power if the second transmit power for that portion of the sidelink shared channel is less than the lower bound transmit power;
   selecting the second transmit power if the second transmit power for that portion of the sidelink shared channel is greater than or equal to the lower bound transmit power and less than or equal to the upper bound transmit power; or
   selecting the upper bound transmit power if the second transmit power for that portion of the sidelink shared channel is greater than the upper bound transmit power.

10. The method of claim 8, further comprising:
grouping a plurality of receiving UEs into multiple sets of receiving UEs in accordance with a pathloss parameter associated with each of the plurality of receiving UEs, each set of the multiple sets of receiving UEs including UEs associated with pathloss parameters within a threshold range of each other, and the multiple sets of receiving UEs including the set of receiving UEs; and
selecting, for communication within the slot, the set of receiving UEs as a result of grouping the plurality of receiving UEs into the multiple sets of receiving UEs.

11. The method of claim 8, wherein:
transmitting to the set of receiving UEs via the sidelink control channel further comprises:
   transmitting sidelink control information (SCI) part one (SCI-1), the SCI-1 indicating a default resource element offset associated with multiple SCI part two (SCI-2) transmissions; and
transmitting to each UE of the set of receiving UEs over the sidelink shared channel further comprises:
   transmitting a different SCI-2 over each portion of the sidelink shared channel, wherein each different SCI-2 indicates a resource element offset associated with one or more subsequent SCI-2 transmissions over one or more subsequent portions of the sidelink shared channel.

12. The method of claim 11, wherein transmitting the different SCI-2 over each portion of the sidelink shared channel further comprises:
   transmitting a first SCI-2 over a first portion of the sidelink shared channel, the first SCI-2 indicating a first resource element offset associated with a second SCI-2 to be transmitted over a second portion of the sidelink shared channel; and
   transmitting the second SCI-2 over the second portion of the sidelink shared channel, the second SCI-2 indicating a second resource element offset associated with a third SCI-2 to be transmitted over a third portion of the sidelink shared channel.

13. The method of claim 11, wherein the resource element offset indicated in each different SCI-2 comprises a delta decrement relative to a previous resource element offset, an indication to maintain the previous resource element offset, or an indication to reset to the default resource element offset indicated in the SCI-1.

14. The method of claim 8, wherein the lower bound transmit power and the upper bound transmit power are defined relative to the nominal transmit power.

15. A non-transitory computer-readable medium storing code for wireless communications at a user equipment (UE), the code comprising instructions executable by one or more processors to:

transmit, to a set of receiving UEs over a sidelink control channel, an indication of a sidelink shared channel within a slot, the sidelink shared channel being partitioned into a plurality of portions within the slot;

receive an indication of a nominal sidelink power parameter and a resource block parameter that are common for each portion of the sidelink shared channel and an indication of a nominal pathloss parameter that is common for the set of receiving UEs;

select, for each portion of the sidelink shared channel, a transmit power using one or more communication parameters that are associated with the sidelink shared channel and that are common to the set of receiving UEs, the selecting the transmit power for each portion of the sidelink shared channel being in accordance with a lower bound transmit power and an upper bound transmit power and comprising:

selecting a nominal transmit power for the sidelink shared channel using the nominal sidelink power parameter, the resource block parameter, and the nominal pathloss parameter; and selecting, for each portion of the sidelink shared channel, a second transmit power using the nominal sidelink power parameter, the resource block parameter, and an actual pathloss parameter associated with each UE of the set of receiving UEs; and transmit, to each UE of the set of receiving UEs over the sidelink shared channel, in accordance with the transmit power selected for each portion of the partitioned sidelink shared channel, the transmitting to each UE of the set of receiving UEs over the sidelink shared channel further comprising transmitting to a different UE of the set of receiving UEs over each portion of the partitioned sidelink shared channel.

16. The non-transitory computer-readable medium of claim 15, wherein the instructions are further executable by the one or more processors to:

compare the second transmit power for each portion of the sidelink shared channel with the lower bound transmit power and the upper bound transmit power, the lower bound transmit power and the upper bound transmit power being defined relative to the nominal transmit power, and wherein selecting the transmit power for each portion of the sidelink shared channel comprises:

selecting the lower bound transmit power if the second transmit power for that portion of the sidelink shared channel is less than the lower bound transmit power;

selecting the second transmit power if the second transmit power for that portion of the sidelink shared channel is greater than or equal to the lower bound transmit power and less than or equal to the upper bound transmit power; or selecting the upper bound transmit power if the second transmit power for that portion of the sidelink shared channel is greater than the upper bound transmit power.

17. The non-transitory computer-readable medium of claim 15, wherein the instructions are further executable by the one or more processors to:

group a plurality of receiving UEs into multiple sets of receiving UEs in accordance with a pathloss parameter associated with each of the plurality of receiving UEs, each set of the multiple sets of receiving UEs including UEs associated with pathloss parameters within a threshold range of each other, and the multiple sets of receiving UEs including the set of receiving UEs; and select, for communication within the slot, the set of receiving UEs as a result of grouping the plurality of receiving UEs into the multiple sets of receiving UEs.

18. The non-transitory computer-readable medium of claim 15, wherein the lower bound transmit power and the upper bound transmit power are defined relative to the nominal transmit power.

19. An apparatus for wireless communications at a user equipment (UE), comprising:

means for transmitting, to a set of receiving UEs over a sidelink control channel, an indication of a sidelink shared channel within a slot, the sidelink shared channel being partitioned into a plurality of portions within the slot;

means for receiving an indication of a nominal sidelink power parameter and a resource block parameter that are common for each portion of the sidelink shared channel;

means for receiving an indication of a nominal pathloss parameter that is common for the set of receiving UEs;

means for selecting, for each portion of the sidelink shared channel, a transmit power using one or more communication parameters that are associated with the sidelink shared channel and that are common to the set of receiving UEs, the selecting the transmit power for each portion of the sidelink shared channel being in accordance with a lower bound transmit power and an upper bound transmit power, wherein the means for selecting the transmit power for each portion of the sidelink shared channel comprises:

means for selecting a nominal transmit power for the sidelink shared channel using the nominal sidelink power parameter, the resource block parameter, and the nominal pathloss parameter; and means for selecting, for each portion of the sidelink shared channel, a second transmit power using the nominal sidelink power parameter, the resource block parameter, and an actual pathloss parameter associated with each UE of the set of receiving UEs; and means for transmitting, to each UE of the set of receiving UEs over the sidelink shared channel, in accordance with the transmit power selected for each portion of the partitioned sidelink shared channel, the transmitting to each UE of the set of receiving UEs over the sidelink shared channel further comprising transmitting to a different UE of the set of receiving UEs over each portion of the partitioned sidelink shared channel.

20. The apparatus of claim 19, further comprising:

means for comparing the second transmit power for each portion of the sidelink shared channel with the lower bound transmit power and the upper bound transmit power, the lower bound transmit power and the upper bound transmit power being defined relative to the nominal transmit power, and wherein the means for selecting the transmit power for each portion of the sidelink shared channel comprises:

means for selecting the lower bound transmit power if the second transmit power for that portion of the sidelink shared channel is less than the lower bound transmit power;

means for selecting the second transmit power if the second transmit power for that portion of the sidelink shared channel is greater than or equal to the lower bound transmit power and less than or equal to the upper bound transmit power; or means for selecting the upper bound transmit power if the second transmit power for that portion of the sidelink shared channel is greater than the upper bound transmit power.

21. The apparatus of claim 19, further comprising:

means for grouping a plurality of receiving UEs into multiple sets of receiving UEs in accordance with a pathloss parameter associated with each of the plurality of receiving UEs, each set of the multiple sets of receiving UEs including UEs associated with pathloss parameters within a threshold range of each other, and the multiple sets of receiving UEs including the set of receiving UEs; and means for selecting, for communication within the slot, the set of receiving UEs as a result of grouping the plurality of receiving UEs into the multiple sets of receiving UEs.

22. The apparatus of claim 19, wherein the lower bound transmit power and the upper bound transmit power are defined relative to the nominal transmit power.

* * * * *